United States Patent
Aoya et al.

(10) Patent No.: US 9,211,672 B2
(45) Date of Patent: Dec. 15, 2015

(54) METHOD FOR MOLDING THERMOPLASTIC RESIN PRODUCT AND MOLDING APPARATUS THEREFOR

(71) Applicant: Toyo Seikan Group Holdings, Ltd., Tokyo (JP)

(72) Inventors: Masaki Aoya, Kanagawa (JP); Satoo Kimura, Kanagawa (JP); Tsutomu Iwasaki, Kanagawa (JP)

(73) Assignee: TOYO SEIKAN GROUP HOLDINGS, LTD., Tokyo (JP)

(*) Notice: Subject to any disclaimer, the term of this patent is extended or adjusted under 35 U.S.C. 154(b) by 0 days.

(21) Appl. No.: 14/150,340

(22) Filed: Jan. 8, 2014

(65) Prior Publication Data

US 2014/0117587 A1 May 1, 2014

Related U.S. Application Data

(63) Continuation of application No. PCT/JP2012/004299, filed on Jul. 3, 2012.

(30) Foreign Application Priority Data

Jul. 8, 2011 (JP) ................................. 2011-151395
Mar. 22, 2012 (JP) ................................. 2012-066348

(51) Int. Cl.
*B29C 59/16* (2006.01)
*B29C 33/06* (2006.01)
(Continued)

(52) U.S. Cl.
CPC ................. *B29C 59/16* (2013.01); *B29C 33/06* (2013.01); *B29C 35/0805* (2013.01);
(Continued)

(58) Field of Classification Search
CPC .. B29C 33/06; B29C 2059/023; B29C 51/42; B29C 59/428; B28C 59/16; G03F 7/0002
USPC .................. 264/496, 402, 403, 404, 39, 327; 425/174.4, 385, 407
See application file for complete search history.

(56) References Cited

U.S. PATENT DOCUMENTS 6,558,411 B1 5/2003 Steen
2006/0192928 A1 8/2006 Kasumi et al.
(Continued)

FOREIGN PATENT DOCUMENTS

JP 57135137 A * 8/1982
JP 2001158044 A 6/2001
(Continued)

OTHER PUBLICATIONS

Extended European Search Report issued in corresponding European Application No. 12812039.1, mailed Feb. 9, 2015 (5 pages).
(Continued)

*Primary Examiner* — Timothy Kennedy
(74) *Attorney, Agent, or Firm* — Osha Liang LLP

(57) ABSTRACT

An apparatus for molding a thermoplastic resin product includes a heating apparatus which conducts heating by radiation of infrared rays by using a light source; a stamper which is radiation heated by infrared rays radiated from the light source; a cooling member which cools the stamper by contacting the stamper which is radiation heated; a first mold which holds the stamper and/or the cooling member in a movable manner, thereby enabling the stamper and the cooling member to be in contact with or remote from with each other; and a second mold which holds a thermoplastic resin to which a structure of a shape-forming surface of the stamper is transferred. The stamper is radiation heated at least in the state where it is remote from the cooling member.

10 Claims, 20 Drawing Sheets

(51) Int. Cl.
*B29C 35/16* (2006.01)
*B29C 59/02* (2006.01)
*B29C 35/08* (2006.01)

(52) U.S. Cl.
CPC ............ *B29C 35/0888* (2013.01); *B29C 35/16* (2013.01); *B29C 59/02* (2013.01); *B29C 2035/0822* (2013.01); *B29C 2059/023* (2013.01)

(56) References Cited

U.S. PATENT DOCUMENTS

| 2011/0024948 A1 | 2/2011 | Takaya et al. |
| 2011/0159209 A1 | 6/2011 | Kawamura et al. |

FOREIGN PATENT DOCUMENTS

| JP | 2001/313152 A | 11/2001 |
| JP | 2002513315 A | 5/2002 |
| JP | 2002/289548 A | 10/2002 |
| JP | 2005074700 A | 3/2005 |
| JP | 2006-88517 A | 4/2006 |
| JP | 2006137019 A | 6/2006 |
| JP | 2006216237 A | 8/2006 |
| JP | 2006-231588 A | 9/2006 |
| JP | 2006255900 A | 9/2006 |
| JP | 2008188953 A | 8/2008 |
| JP | 2008-288673 A | 11/2008 |
| JP | 4363727 B2 | 11/2009 |
| JP | 2011061214 A | 3/2011 |
| JP | 2012-91456 A | 5/2012 |

OTHER PUBLICATIONS

International Search Report issued in International Application No. PCT/JP2012/004299, mailed on Sep. 11, 2012 (2 pages).
Written Opinion of the International Search Authority for PCT/JP2012/004299 mailed Sep. 11, 2012 (4 pages).
International Preliminary Report on Patentability issued in PCT/JP2012/004299 mailed Jan. 23, 2014 (2 pages).
Office Action issued in corresponding Chinese Application No. 201280033225.6 dated Apr. 7, 2015, and English translation thereof (13 pages).
Office Action issued in corresponding Japanese Application No. 2011-151395 dated Sep. 1, 2015 (3 pages).

* cited by examiner (a)

(b)

(a)

(b)

(a)

(b)

METHOD FOR MOLDING THERMOPLASTIC RESIN PRODUCT AND MOLDING APPARATUS THEREFOR

TECHNICAL FIELD

The present invention relates to a method for molding a thermoplastic resin product and a molding apparatus therefor. In particular, the present invention relates to a method for molding a thermoplastic resin product and a molding apparatus therefor which enable productivity and quality to be improved.

BACKGROUND ART

In a microchemical chip, a microfluid device, a light-shielding panel, a Fresnel lens, an optical disc, an optical device or the like, establishment of a technology of transferring a fine pattern (structure) to a plastic molded product with a high degree of accuracy or a technology of improving the productivity of the transfer or the like is desired. Under such circumstances, various technologies have been proposed.

For example, Patent Document 1 discloses a technology of a method for molding and processing plastics, in which a base having a transfer surface and is formed of a plastic material is prepared, the base is secured in the state where the transfer surface is exposed, the shape-forming surface of a stamper which is at least partially formed of an infrared rays-transmissive material is held in close contact with the transfer surface of the base, and the stamper is irradiated with infrared rays in a direction in which the base is directed.

Patent Document 2 discloses a technology of a hot press molding method in which a desired pattern is transferred to the surface of a thermoplastic resin plate by hot press molding.

This technology is characterized in that, between a cooling plate to be mounted in a pressing machine and the thermoplastic resin plate, a heating plate provided with a stamper having a pattern on the side facing the thermoplastic resin plate is arranged; before pressing operation, the stamper and the heating plate are heated at a first predetermined temperature exceeding the softening temperature of the thermoplastic resin plate by high-frequency induction heating; then, the stamper is pushed to the surface of the thermoplastic resin plate by pressing operation to allow the pattern to be transferred to the surface of the thermoplastic resin plate; and with the stamper being pushed to the thermoplastic resin plate, the heating plate and the stamper are cooled by the cooling plate to a second predetermined temperature which is lower than the softening temperature.

Patent Document 3 discloses a technology of an irradiation apparatus which is provided with a light source including a light-conducting means and a reflection apparatus and is suited to irradiation of a site which is defined in a restrictive manner (light region), in particular a pathological site of a skin which suffers cancerous tumor or the like. In this technology, the reflection apparatus has a concave mirror having a curvature that enables light from the light source to be concentrated on one end surface of a transparent cylindrical rod, and, by the light directed to a lens from the other end surface of the rod, the end surface of the rod is projected to a defined site which would be irradiated.

Patent Document 4 discloses a plane heating type infrared radiation heating device which comprises an infrared heating mechanism part with a built-in infrared lamp and is formed of a composite reflection mirror obtained by combining a hollow conical reflecting mirror and a cylindrical reflecting mirror and a base which serves as a lid of a vacuum chamber in which a transparent disc provided with a transparent column is fixed to an open window formed in the center thereof. The composite reflecting mirror is secured on the base, and infrared rays radiating from an infrared lamp include rectilinearly advancing light, light reflected by the conical reflecting mirror and light obliquely reflected by the cylindrical reflecting mirror. A soaking disc plate is arranged in an irradiation region of infrared rays in which an object to be heated is heated by irradiation, and irradiation intensities of infrared rays radiated rectilinearly from an infrared lamp and infrared rays which are radiated in a horizontal direction and reflected by the conical reflecting mirror are allowed to be uniform, and the object to be heated is irradiated with this uniform light. By this light, the entire object to be heated is heated approximately uniformly. This technology is characterized in that the infrared heating mechanism part comprising the composite reflecting mirror and the base are integrally formed in advance.

Patent Document 5 discloses a technology of a method for molding and processing plastics, in which a base which has a transfer surface and is formed of a plastic material is prepared, the base is fixed in the state where the transfer surface is exposed, the shape-forming surface of a stamper which is at least partially formed of an infrared rays-transmissive material is held in close contact with the transfer surface of the base, and the stamper is irradiated with infrared rays in a direction in which the base is directed.

RELATED ART DOCUMENTS

Patent Documents

Patent Document 1: JP-A-2001-158044
Patent Document 2: JP-A-2006-255900
Patent Document 3: JP-T-2002-513315
Patent Document 4: JP-A-2006-216237
Patent Document 5: Japanese Patent No. 4363727

SUMMARY OF THE INVENTION

Problems to be Solved by the Invention

However, in above-mentioned method for molding and processing plastics disclosed in Patent Document 1, the temperature distribution of the stamper is poor, and hence, in order to allow the entire molding surface to be heated to a temperature at which molding is possible, a long heating time is required. In addition, a long cooling time is also required, and hence molding cycle is prolonged, whereby improvement in productivity becomes impossible.

In the above-mentioned hot press molding method disclosed in Patent Document 2, the stamper and the heating plate are heated by high-frequency induction heating. However, the temperature distribution of the stamper is poor by the high-frequency induction heating, and in order to conduct uniform heating, a long heating time is required. Further, since heating during molding (pressing) cannot be conducted, it is required to heat the heating plate, and as a result, the heating time and the cooling time are prolonged, whereby improvement in productivity cannot be attained.

Further, in the technologies in Patent Documents 1 and 2, if cooling after the transfer is insufficient, a molded product has a poor appearance.

The above-mentioned irradiation apparatus disclosed in Patent Document 3 has a concave mirror, a cylindrical rod, a lens and the like. Light emitted from a light source is concentrated by the concave mirror and then guided to the cylindrical rod. Since the rod is cylindrical, the irradiance is concentrated on the center of the rod shaft. Therefore, a large-area surface to be irradiated cannot be heated uniformly. Further, the plane heating type infrared radiation heating device (infrared rays/uniform temperature heat treatment device) disclosed in Patent Document 4 is provided with a hollow conical reflecting mirror, a cylindrical reflecting mirror, a soaking disc plate, a transparent column and the like, and light emitted from a light source is guided to a surface to be irradiated through a light conduction path which is rotation-symmetrical with the illumination axis of the conical reflecting mirror, the cylindrical reflecting mirror, a transparent column and the like. Therefore, the irradiance is concentrated in the center of the illumination axis, and a large-area surface to be irradiated cannot be heated uniformly.

That is, in the technologies of Patent Documents 3 and 4, a surface to be irradiated cannot be uniformly irradiated by light emitted from a light source and the surface to be irradiated cannot be heated uniformly.

In Patent Document 5, a means by which a large-area surface to be transferred is irradiated uniformly, a transfer surface is heated uniformly and transfer is conducted with a uniform transfer ratio is not disclosed.

The present invention has been made in order to solve the above-mentioned problems, and an object of the present invention is to provide a method for molding a thermoplastic resin product and a molding apparatus therefor which enable productivity, quality and the like to be improved.

Means for Solving the Problem

In order to attain the above-mentioned object, a method for molding a thermoplastic resin product according to the present invention comprises:

a heating step in which a stamper which is remote from a cooling member is radiation heated with infrared rays radiated from a heating apparatus;

a transfer step in which a structure of a shape-forming surface of the stamper which has been radiation heated is transferred to a transfer surface of a thermoplastic resin;

a cooling step in which, in the state where the shape-forming surface is pressed against the transfer surface, the cooling member which is in contact with the stamper cools the stamper, thereby solidifying or curing the thermoplastic resin; and a mold-releasing step in which a molded product is released from a mold by releasing the state where the shape-forming surface is pressed against the transfer surface.

Further, a molding apparatus for a thermoplastic resin product of the present invention comprises:

a heating apparatus which conducts heating by radiation of infrared rays by using a light source;

a stamper which is radiation heated by infrared rays radiated from the light source;

a cooling member which cools the stamper by contacting the stamper which is radiation heated;

a first mold which holds the stamper and/or the cooling member in a movable manner, thereby enabling the stamper and the cooling member to be in contact with or remote from with each other; and a second mold which holds a thermoplastic resin to which a structure of a shape-forming surface of the stamper is transferred; wherein the stamper is radiation heated at least in the state where it is remote from the cooling member.

Advantageous Effects of the Invention

According to the method for molding a thermoplastic resin product and the molding apparatus therefor of the present invention, the stamper, which is remote from the cooling member, is radiation heated in the heating step. As a result, the stamper can be effectively heated, resulting in a shortened heating time. In addition, since the cooling member is remote from the stamper, elevation in temperature of the cooling member can be suppressed, and as a result, the cooling time can be shortened in the cooling step in which the stamper is cooled. As a result, the productivity can be significantly improved.

Further, cooling after the transfer can be conducted effectively by using the cooling member, of which the temperature elevation has been suppressed, and as a result, poor appearance of a molded product can be prevented to improve the quality.

Further, light from a light source can be delivered to the large-area surface to be irradiated uniformly, and a transfer surface having a large area can be transferred at a uniform transfer ratio.

MODE FOR CARRYING OUT THE INVENTION

Figure 1:
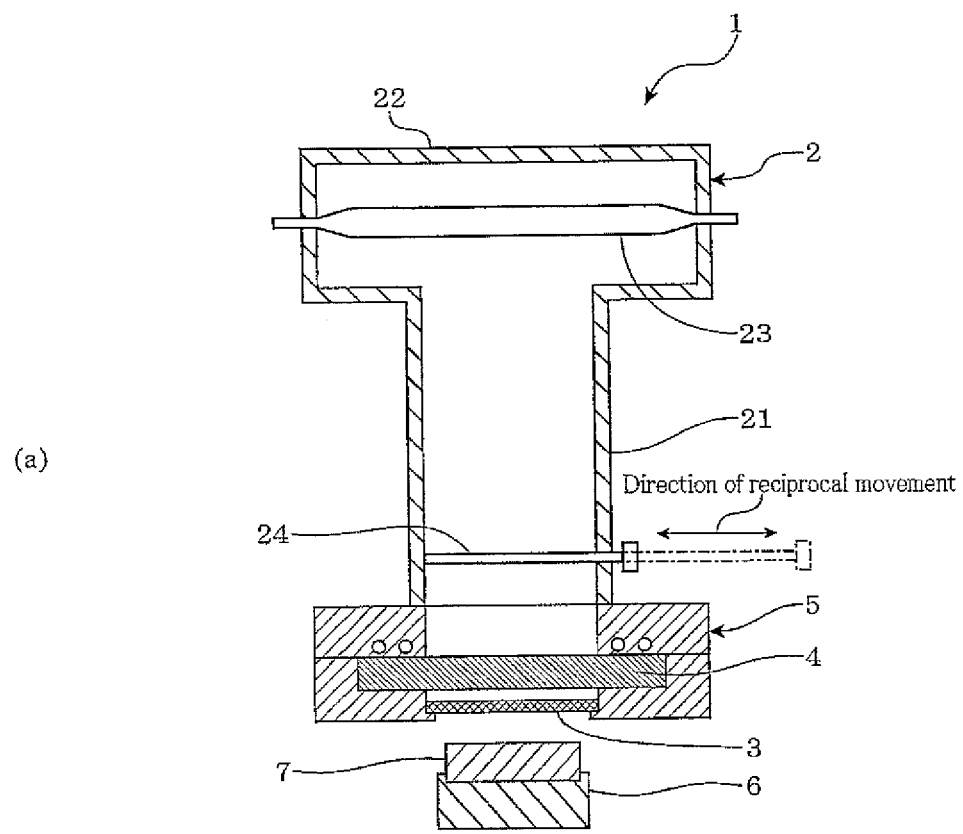
FIG. 1 is a schematic view for explaining an apparatus for molding a thermoplastic resin product according to a first embodiment of the present invention, in which (a) is a cross-sectional view and (b) is an enlarged cross-sectional view of essential parts.
Figure 1:
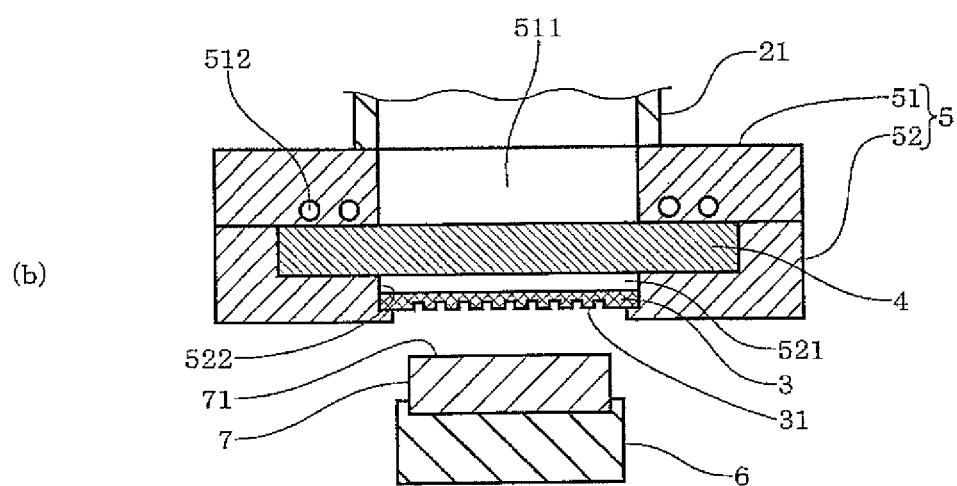

First Embodiment of the Apparatus for Molding a Thermoplastic Resin Product and the Method for Molding a Thermoplastic Resin Product FIG. 1 is a schematic view for explaining an apparatus for molding a thermoplastic resin product according to a first embodiment of the present invention, in which (a) is a cross-sectional view and (b) is an enlarged cross-sectional view of essential parts.

In FIG. 1, an apparatus 1 for molding a thermoplastic resin product according to a first embodiment (hereinafter, appropriately abbreviated as the molding apparatus 1) is provided with a heating apparatus 2, a stamper 3, a cooling member 4, a first mold 5, a second mold 6 and the like. In this molding apparatus 1, the stamper 3 is radiation heated at least in the state where it is remote from the cooling member 4, and the structure of a shape-forming surface 31 of the stamper 3 which has been radiation heated is transferred to the transfer surface of a thermoplastic resin.

Here, the "in this molding apparatus 1, the stamper 3 is radiation heated at least in the state where it is remote from the cooling member 4" is intended to mean that the stamper 3 is radiation heated in the state where it is remote from the cooling member 4, and thereafter, the stamper 3 may be further radiation heated in the state where it is in contact with the cooling member 4.

In this embodiment, the thermoplastic resin is a base 7, which has been molded in advance. The structure of the shape-forming surface 31 is transferred to a transfer surface 71 of the base 7.

Here, the base 7 which has been molded in advance means a base which has been processed by an injection molding step or a pressure molding step (a base at a normal temperature after being underwent by each molding step); specifically, the base includes a circular or rectangular plastic base such as a circular disc for CDs, a rectangular sheet for color filters or a sheet which has been wound in the form of a roll, or a three-dimensionally molded product such as a cap mouth part of a bottle for soy sauce, sauce or dressing, a cap mouth part of a PET bottle for coffee or the like.

The thermoplastic resin in this embodiment is not restricted to the base 7 which has been molded in advance. For example, it may be a base (not shown) which has been heated in an injection molding step or a compression molding step.

Here, a base which has been heated in an injection molding step or a compression molding step is a base which has not been underwent completely an injection molding step or a compression molding step (for example, a base which is in the molten or softened state in the middle of the step, or a base which has been underwent each step, but has not been cooled to normal temperature and is still hot).

(Heating Apparatus)

The heating apparatus 2 is provided with a light pipe 21 having a polygonal cross section, a light box 22 which is connected to the light pipe 21 and has a polygonal cross section, a light source 23 which is accommodated within the light box 22, a shutter 24 which shields infrared rays radiated from an irradiation port of the light pipe 21 or the like. The cross sectional shape of the light pipe 21 may preferably be a triangle, a square, a regular hexagon or a parallelohexagon. Further, the cross sectional shape of the light box 22 may preferably be a triangle, a square, a regular hexagon or a parallelohexagon. Due to such a configuration, the heating apparatus 2 can realize a radiance distribution which has been uniformized at a significantly high level.

This heating apparatus 2 has an almost similar configuration as that of a heating apparatus mentioned later, i.e. a heating apparatus disclosed by the inventors of the present application in Japanese Patent Application No. 2011-151395. This heating apparatus enables light emitted from the light source 23 to be delivered to the surface to be irradiated (upper surface of the stamper 3) uniformly, whereby the surface to be irradiated can be uniformly heated.

The configuration of the heating apparatus 2 is not restricted to that mentioned above. For example, though not shown, the heating apparatus may be one having a configuration different from that mentioned above and is capable of conducting radiation heating using a light source, a carbon dioxide laser, a semiconductor laser and a scanning type laser obtained by combining these lasers with a scanner.

(Stamper)

The stamper 3 is a plate-like member normally formed of Ni or Si, and is radiation heated by infrared rays emitted from the light source 23. The stamper 3 of this embodiment has a thickness of normally several hundreds μm. However, as mentioned later, the thickness of the stamper 3 is not limited thereto. This stamper 3 has a shape-forming surface 31 at the bottom surface thereof, and a convex part and a concave part are formed on the shape-forming surface 31.

Although not shown, a black film may be formed on the upper surface of the stamper 3. Due to the formation of such a black film, infrared rays are absorbed effectively. As a result, the shape-forming surface 31 of the stamper 3 is heated uniformly and quickly by radiation heating of infrared rays. Further, instead of formation of the black film, a plating film may be formed on the upper surface of the stamper 3. As examples of the black film, a silicone-based black paint can be mentioned, and as examples of the plating film, a black Cr plating film, a black Ni plating film or the like can be mentioned.

(Cooling Member)

The cooling member 4 is normally a plate-like member formed of an infrared rays-transmissive material, and it contacts the stamper 3 to cool the stamper 3. As the infrared rays-transmissive material, sapphire is used in this embodiment. The infrared rays-transmissive material is not limited to sapphire, and Si, Ge, MgO, ZnSe, quartz glass, heat-resistant glass or the like may be used, for example. By using these materials, the cooling member 4 allows infrared rays emitted from the heating apparatus 2 to be transmitted, whereby the stamper 3 can be radiation heated efficiently. In addition, since the cooling member 4 allows infrared rays radiated from the heating apparatus 2 to be transmitted, and an increase in temperature of the cooling member 4 is suppressed, the stamper 3 can be cooled effectively when the cooling member 4 is in contact with the stamper 3 which has been radiation heated to cool the stamper 3.

As mentioned above, the stamper 3 of this embodiment has a thickness of several hundreds μm. Therefore, the cooling member 4 serves, in the transfer step, as a reinforcing member which prevents deformation of the stamper 3 or a supporting member which supports the stamper 3 in order to prevent the stamper from being deformed.

(First Mold)

A first mold 5 has a base 51, a holder 52 and the like, and movably holds the stamper 3 so as to allow the stamper 3 and the cooling member 4 to be in contact with or remote from each other. In this embodiment, the first mold has a configuration in which it movably holds the stamper 3 and secures the cooling member 4. The configuration is, however, not limited thereto. For example, although not shown, the first mold 5 may have a configuration in which the stamper 3 is secured and the cooling member 4 is movably held, or may have a configuration in which the stamper 3 and the cooling member 4 may be movably held.

The base 51 is a plate-like member in which an opening 511 is formed in the approximately center thereof, and the upper surface thereof is connected to a lower end of the light pipe 21 and the cooling member 4 is secured to the lower surface. The opening 511 is formed at a position almost corresponding to the light pipe 21, and has a cross-sectional shape which is almost the same as that of the light pipe 21. The side surface has a mirror surface formed by silver plating or the like as in the case of the inner surface of the light pipe 21 and the light box 22. As a result, the opening 511 functions almost similarly as the light pipe 21, and allows light from the light source 23 to be uniformly radiated on the surface to be irradiated (the upper surface of the stamper 3), whereby the surface to be irradiated can be uniformly heated.

It is preferred that the molding apparatus 1 have a cooling means, whereby the cooling member is forcedly cooled. That is, in this embodiment, in the base 51, a channel 512 for allowing a coolant to flow is formed in the vicinity of the peripheral part of the cooling member 4. By allowing a coolant to flow in the channel 512, the cooling member 4 is forcedly cooled. Due to such a configuration, since an increase in temperature of the cooling member 4 is suppressed, when it is brought into contact with the stamper 3 which has been radiation heated to cool the stamper 3, the stamper 3 can be cooled effectively.

The configuration of the cooling member is not limited to that mentioned above, and cooling members with various configurations can be used.

A holder 52 is a plate-like member which is attached to the lower surface of the base 51. On the upper surface thereof, a first concave part for accommodating the cooling member 4 is formed. Below this part, a second concave part which accommodates the stamper 3 in a vertically movable manner is formed. Below this part, an opening for allowing the shape-forming surface 31 of the stamper 3 to be exposed is formed. When this holder 52 is attached to the base 51, the cooling member 4 is secured at a position corresponding to the light pipe 21, and the stamper 3 is attached at a position corresponding to the light pipe 21 and below the cooling member 4 in a vertically movable manner.

The side surface of the second concave part is a guide surface 522 which guides the movement of the stamper 3, and between the stamper 3 which is supported by a stepped surface of the second concave part by gravity and the cooling member 4, a gap 521 is formed.

The thickness of the gap 521 (the distance in the vertical direction) is normally 0. several mm, but the thickness is not limited thereto.

The guide surface 522 functions as a guide means which guides the movement of the stamper 3. The guide means is not limited to the guide surface 522.

(Second Mold)

A second mold 6 is a plate-like member, and holds the base 7 to which the structure of the shape-forming surface 31 of the stamper 3 is transferred. That is, in the second mold 6, a concave part having a shape corresponding to the base 7 is formed on its upper surface, and the base 7 is mounted on this concave part in a positioned state.

The first mold 5 and the second mold 6 are attached to a pressing machine (for example, a low-pressure pressing machine (pressing pressure: 1.0 MPa)), though not shown. The second mold 6 is moved up and down, for example.

A structure which movably holds the stamper 3 or the cooling member 4 is not particularly restricted, and various application examples can be mentioned.

One of the above-mentioned application examples will be explained with reference to the drawings.

Application Example

Figure 2:
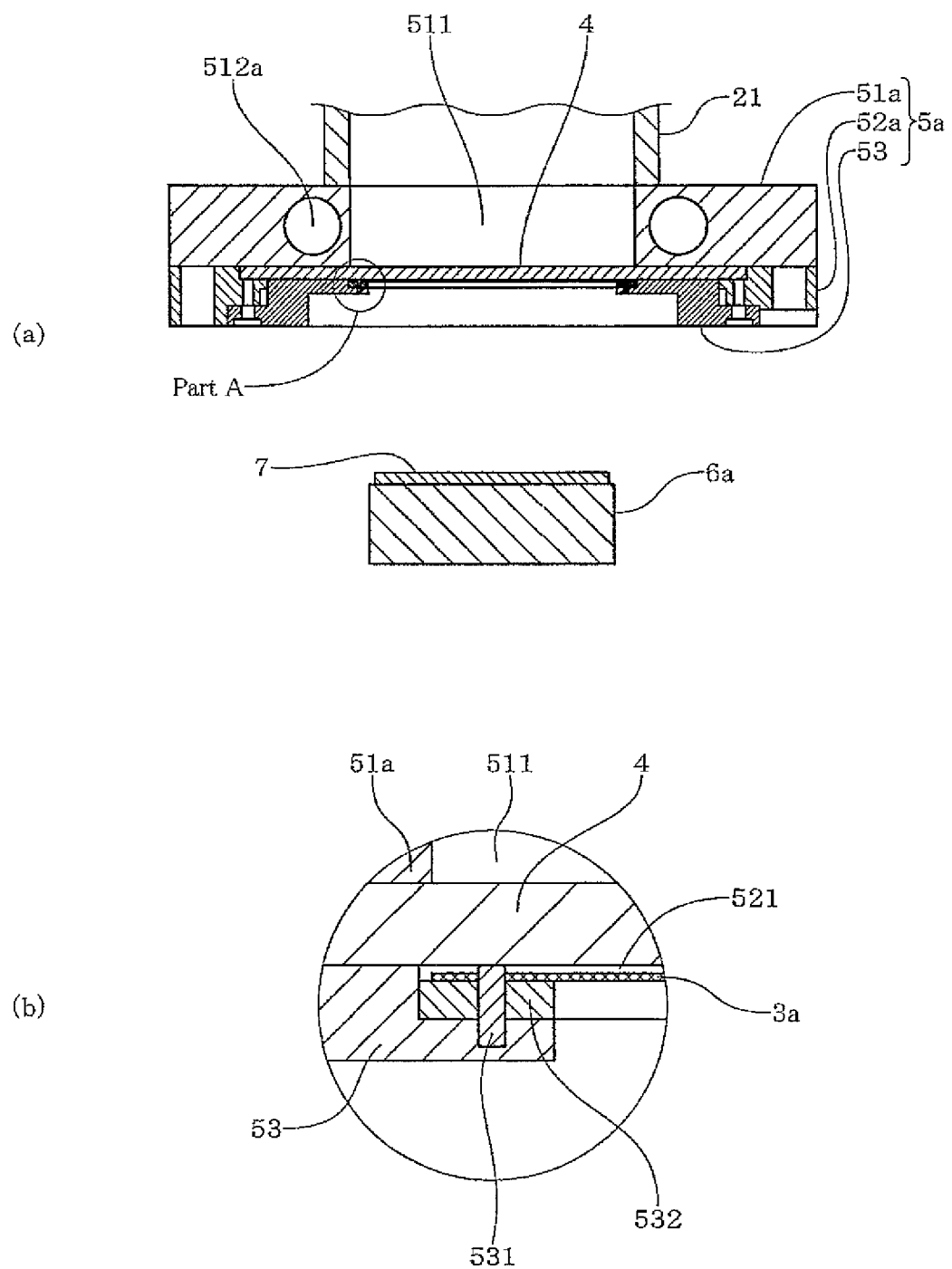
FIG. 2 is a schematic view for explaining an apparatus for molding a thermoplastic resin product according to the application example of the present invention, in which (a) is a cross-sectional view of essential parts and (b) is an enlarged cross-sectional view of part A.

FIG. 2 is a schematic view for explaining an apparatus for molding a thermoplastic resin product according to the application example of the present invention, in which (a) is a cross-sectional view of essential parts and (b) is an enlarged cross-sectional view of part A.

In FIG. 2, the molding apparatus according to this application example differs from the molding apparatus 1 in that a jaw 53, a guide pin 531 and a retainer 532, and the like. Other configurations of this application example are almost the same as those of the molding apparatus 1.

Therefore, in FIG. 2, constituting elements which are similar to those in FIG. 1 are indicated by the same referential numerals, and a detailed explanation is omitted.

A first mold 5a has a base 51a, a holder 52a, a jaw 53 and the like. The base 51a differs from the above-mentioned base 51 in that a channel 512a having a large flow channel area is provided, and the like. The other configurations of the base 51a are almost similar to those of the base 51.

The holder 52a is a ring-like member in which a concave part for accommodating the peripheral part of the cooling member 4 is formed. By attaching to the base 51a, the cooling member 4 is secured to the lower surface of the base 51a.

As viewed from the above, the jaw 53 has an approximately rectangular shape, and a concave part for accommodating the edge part of a stamper 3a is formed at an inner end thereof. Due to the formation of the jaw 53 at four locations of the holder 52a, the stamper 3a is attached at a position corresponding to the light pipe 21 and below the cooling member 4 in a vertically movable manner. Due to such a configuration, the above-mentioned holder 52 of the first embodiment is brought into contact with the entire peripheral part of the stamper 3, and the entire peripheral part of the stamper 3 is cooled by thermal conduction, whereby uniform heating is adversely affected. On the contrary, the jaw 53 is brought into contact with four locations of the peripheral part of the stamper 3a, and the entire peripheral part of the stamper 3a is not cooled by thermal conduction, and as a result, adverse effects exerted on the uniform heating are suppressed.

It is preferred that the stamper 3a be held by the first mold 5a through a heat-insulating member. That is, in this application example, a ring-like retainer 532 as a heat-insulating member, which is formed of poly ether ketone, a fluorine resin, ceramic or the like is engaged with the concave part of the jaw 53, and on the upper surface of the retainer 532, the stamper 3a is mounted. By this configuration, the peripheral part of the stamper 3a can be prevented from being cooled by thermal conduction, and hence, adverse effects exerted on the uniform heating can be effectively suppressed. If heating is not conducted uniformly, in order to elevate the temperature of a part which is not heated, not only the heating time is prolonged, but also a certain part is excessively heated. Then, in order to cool this part, a too long cooling time is taken in the cooling step, resulting in falling into a vicious cycle.

It is preferred that the movement of the stamper 3a be guided by a guide pin 531 as a guide means. That is, in the first mold 5a, the guide pin 531 is vertically arranged in the front end part of the jaw 53. In the retainer 532 and the stamper 3a, a hole through which the guide pin 531 is passed is formed. Due to such a configuration, the stamper 3a can move smoothly in a vertical direction, and since it is engaged with the guide pin 531, removal of the stamper 3a can be surely prevented.

In this application example, the stamper 3a is moved upward as it is remote from the retainer 532. The configuration is not limited thereto. For example, a configuration may be mentioned in which the stamper 3a and the retainer 532 are jointed and the stamper 3a and the retainer 532 move vertically. Due to such a configuration, if the size of the stamper 3a is large (for example, A4 size or larger), the retainer 532 can reinforce the stamper 3a, whereby durability and the like of the stamper 3a can be improved.

In the second mold 6a, the upper surface is flat. Although not shown, a plurality of suction holes are formed in the upper surface, and the base 7, which is mounted in the positioned state, is vacuum sucked. Due to such a configuration, the second mold 6a can hold the base 7 at a prescribed position almost as in the case of the second mold 6 of the above-mentioned embodiment.

Next, the operation of the molding apparatus 1 with the above-mentioned configuration and the first embodiment of the method for molding a thermoplastic resin product and the like will be explained with reference to the drawings.

Figure 3:
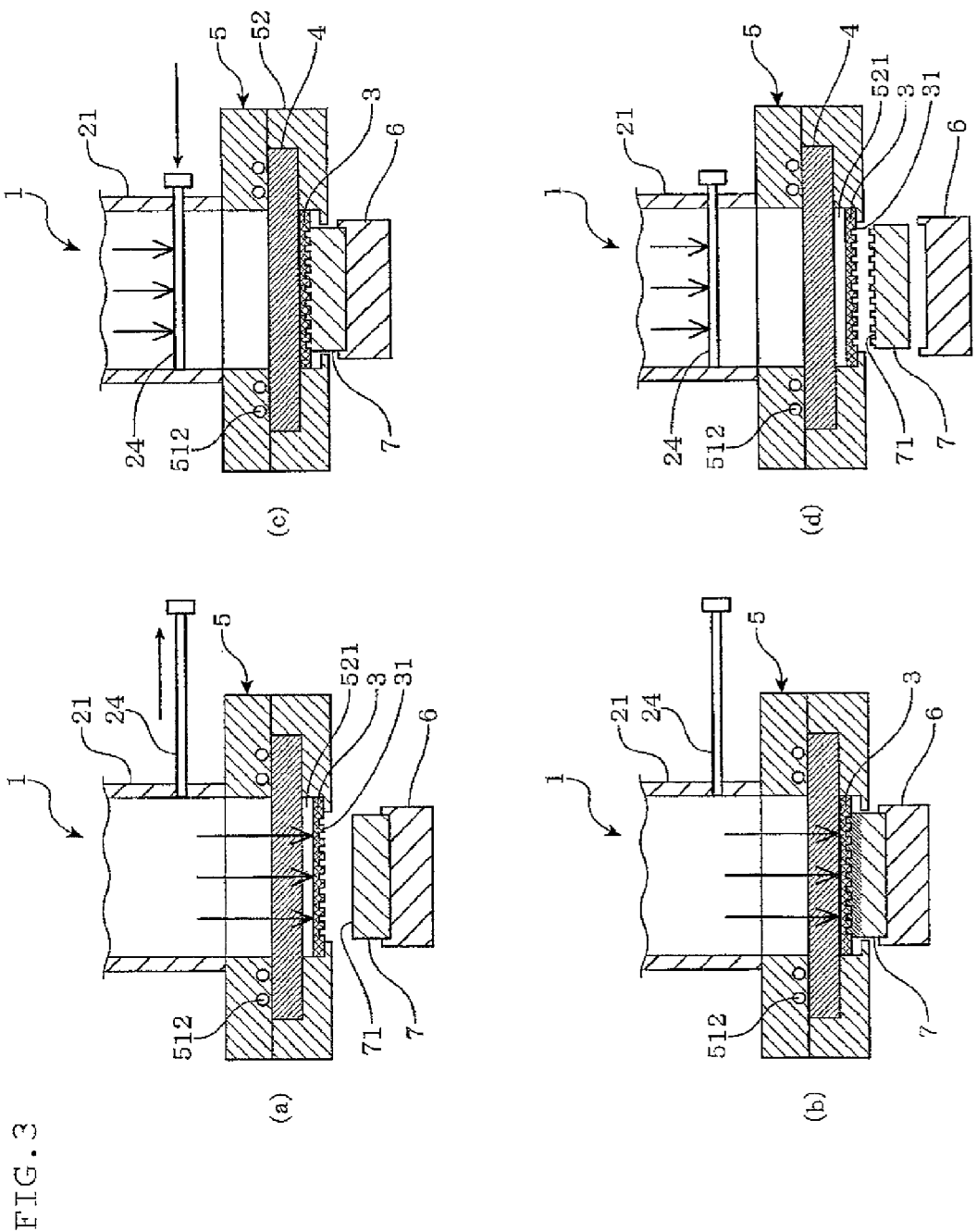
FIG. 3 is a schematic cross-sectional view for explaining a method for molding a thermoplastic resin product according to the first embodiment of the present invention.

FIG. 3 is a schematic cross-sectional view for explaining a method for molding a thermoplastic resin product according to the first embodiment of the present invention.

In FIG. 3, the method for molding a thermoplastic resin product of this embodiment is a molding method in which compression molding is conducted for the base 7 by using the molding apparatus 1, and comprises a heating step, a transfer step, a cooling step and a mold-releasing step.

In this embodiment, the material of the base 7 is a crystalline thermoplastic resin such as polyethylene terephthalate. The material is not limited thereto, and it may be polypropylene, polyethylene and nylon. Further, as the amorphous thermoplastic resin, polystyrene, methyl polyacrylate and cyclic olefin copolymer may be mentioned. Further, the crystalline thermoplastic resin is solidified upon cooling, and the amorphous thermoplastic resin is cured upon cooling.

(Heating Step)

In the molding apparatus 1, as shown in FIG. 3(a), a shutter 24 is opened, and infrared rays emitted from the heating apparatus 2 radiation heat the stamper 3 which is remote from the cooling member 4 (heating step). That is, in this heating step, emitted infrared rays transmit the cooling member 4 formed of an infrared rays-transmissive material and radiation heat the stamper 3.

In this way, by radiation heating the stamper 3 which is remote from the cooling member 4, thermal conduction from the stamper 3 to the cooling member 4 is not conducted, the stamper 3 can be heated effectively. Further, since the cooling member 4 allows infrared rays to be transmitted, heating can be conducted effectively, whereby the heating time can be shortened. Further, in this embodiment, heating is conducted also in the transfer step mentioned later. However, in this case, the stamper 3 is heated in advance, whereby the heating time in the transfer step can be shortened.

The cooling member 4 is not substantially heated by irradiation of infrared rays. In addition, since it is remote from the stamper 3, it is not heated by thermal conduction from the stamper 3 which has been radiation heated. As a result, an increase in temperature can effectively suppressed. By this, when the cooling member 4 cools the stamper 3 in the cooling step mentioned later, the cooling time can be shortened.

Normally, the base 7 is held by the second mold 6 when infrared rays emitted from the heating apparatus 2 start to radiantly heat the stamper 3 which is remote from the cooling member 4. Timing of holding of the base 7 by the second mold is not limited to this. For example, the base 7 may be held by the second mold 6 during the radiation heating. By this, the molding cycle can be shortened in automatic continuous molding.

(Transfer Step)

Subsequently, as shown in FIG. 3(b), the molding apparatus 1b allows the structure of the shape-forming surface 31 of the radiation heated stamper 3 to be transferred to the transfer surface 71 of the base 7 (transfer step). That is, in this transfer step, the second mold 6 is lifted up as mold shaping, the transfer surface 71 of the base 7 is brought into contact with the shape-forming surface 31 of the stamper 3, and subsequently, the stamper 3 is moved upward in such a manner it is pushed up. In the state where the stamper 3 is in contact with the cooling member 4, the transfer surface 71 is pressed against the shape-forming surface 31, whereby the structure of the shape-forming surface 31 is transferred to the transfer surface 71 of the base 7.

In FIG. 3(b), a molten or softened part of the base 7 is indicated by hatching with a narrow pitch.

In this embodiment, the thickness of the stamper 3 is several hundreds μm. Due to the small mechanical strength, the transfer is conducted in the state where the cooling member 4 is in contact with the stamper 3. As a result, a disadvantage that the stamper 3 is deformed can be prevented, whereby transfer accuracy and the like can be improved.

Further, in this embodiment, in the transfer step, the stamper 3 is radiation heated. That is, in the molding apparatus 1, as shown in FIG. 3(b), the shutter 24 is opened, and infrared rays emitted from the heating apparatus 2 radiation heat the stamper 3 which is in contact with the cooling member 4. By this, since the stamper 3 is radiation heated also in the transfer step, a thermoplastic resin of the transfer surface 71 of the base 7 or its vicinity can be molten or softened, whereby the structure of the shape-forming surface 31 of the stamper 3 is transferred to the transfer surface 71 of the base 7.

The radiation heating is conducted in the transfer step. The manner is not limited thereto. For example, by increasing the thermal capacity of the stamper 3, or by pre-heating the transfer surface 71 of the base 7, for example, the radiation heating may be omitted in the transfer step.

(Cooling Step)

Subsequently, in the molding apparatus 1, as shown in FIG. 3(*c*), in the state where the shape-forming surface 31 is pressed against the transfer surface 71, the cooling member 4 which is in contact with the stamper 3 cools the stamper 3, thereby to solidify or cure the base 7 (cooling step). That is, in this cooling step, the shutter 24 is closed to stop the radiation heating, and the stamper 3 is cooled by thermal conduction to the cooling member 4.

Here, the cooling member 4 is in contact with the stamper 3 in the transfer step, and is heated by thermal conduction. However, as mentioned above, in the heating step, it is not almost heated in the heating step by irradiation of infrared rays. In addition, since it is remote from the stamper 3, it is not heated by thermal conduction from the stamper 3 which has been radiation heated, whereby heating can be effectively suppressed. As a result, when the stamper 3 is cooled by the cooling member 4, the cooling time can be shortened.

Further, since cooling after the transfer can be conducted effectively by the cooling member 4, of which the temperature elevation has been effectively suppressed, occurrence of poor appearance of a molded product (for example, formation of protruded parts or the like) can be prevented, whereby quality can be improved.

(Mold-Releasing Step)

Subsequently, in the molding apparatus 1, as shown in FIG. 3(*d*), by releasing the state where the shape-forming surface 31 is pressed against the transfer surface 71, the molded product is removed from the mold (mold-releasing step). That is, in this mold-releasing step, the second mold 6 is lowered, and the stamper 3 is separated from the cooling member 4 and moves downward. Then, when the stamper 3 is engaged with the holder 52, the transfer surface 71 is separated from the shape-forming surface 31, and the second mold 6 is lowered to the original position. Thereafter, the base 7 is transported, whereby the one cycle of molding is completed.

As explained above, according the molding apparatus 1 and the method for molding a thermoplastic resin product according to this embodiment, since the stamper 3 which is remote from the cooling member 4 is radiatngly heated in the heating step, the heating time can be shortened. In addition, an increase in temperature of the cooling member 4 can be suppressed. Further, in the cooling step in which the stamper 3 is cooled, the cooling time can be shortened, whereby the productivity can be significantly improved.

Further, since cooling after the transfer can be effectively conducted by the cooling member 4 of which an increase in temperature has been suppressed, occurrence of poor appearance of a molded product can be prevented, whereby quality can be improved.

[Second Embodiment of the Apparatus for Molding a Thermoplastic Resin Product and the Method for Molding]

Figure 4:
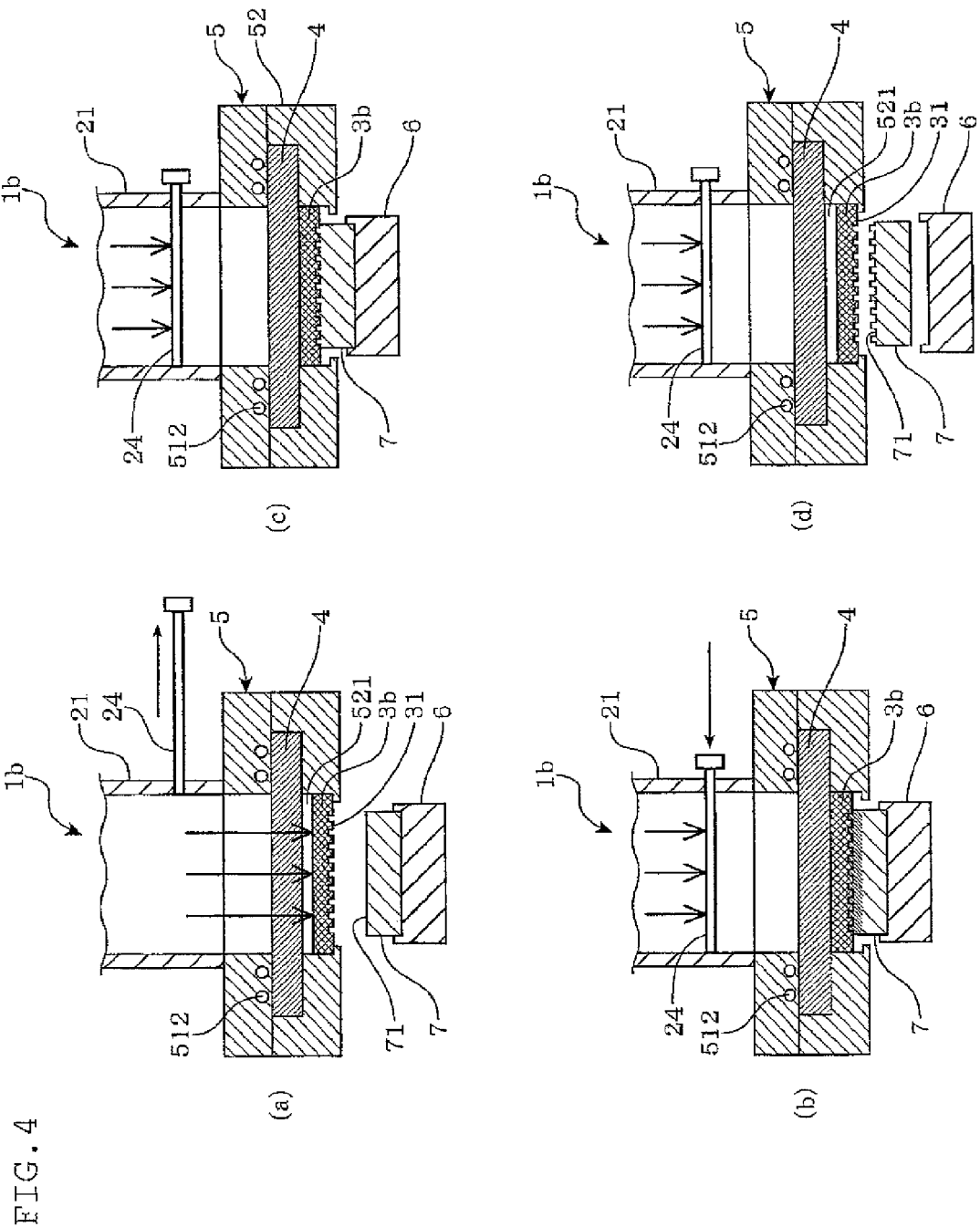
FIG. 4 is a schematic cross-sectional view for explaining an apparatus for molding a thermoplastic resin product and a method for molding a thermoplastic resin product according to a second embodiment of the present invention.

FIG. 4 is a schematic cross-sectional view for explaining an apparatus for molding a thermoplastic resin product and a method for molding a thermoplastic resin product according to a second embodiment of the present invention.

In FIG. 4, the molding apparatus 1*b* of this embodiment differs from the molding apparatus 1 of the first embodiment in that the stamper 3*b* is thicker, that the stamper 3*b* is not radiation heated in the transfer step, that transfer is conducted in the heating step by utilizing only heat which has been stored by the stamper 3*b*, and the like. Other configurations and the like of this embodiment are almost similar to those of the molding apparatus 1.

Therefore, in FIG. 4, constituting elements which are similar to those in FIG. 1 are indicated by the same referential numerals, and a detailed explanation is omitted.

(Stamper)

The stamper 3*b* differs from the stamper 3 of the above-mentioned first embodiment in that it has a thickness of 1. several mm to several mm. Other structures of the stamper 3*b* are almost the same as those of the stamper 3. This stamper 3*b* can have a thermal capacity larger than that of the stamper 3. When it is radiation heated in the heating step, even if it is not radiation heated in the transfer step, the structure of the shape-forming surface 31 of the stamper 3*b* can be transferred to the transfer surface 71 of the base 7.

Next, the operation of the molding apparatus 1*b* having the above-mentioned configuration and the second embodiment of the method for molding a thermoplastic resin product or the like will be explained.

In FIG. 4, the method for molding a thermoplastic resin product of this embodiment is a molding method in which compression molding is conducted for the base 7 by means of a molding apparatus 1*b*. This method includes a heating step, a transfer step, a cooling step and a mold-releasing step.

(Heating Step)

First, as shown in FIG. 4(*a*), in the molding apparatus 1*b*, the shutter 24 is opened, and the stamper 3*b* which is remote from the cooling member 4 is radiation heated with infrared rays radiated from a heating apparatus 2 to a temperature at which there is no need to conduct radiation heating in the transfer step (heating step).

By this configuration, by radiation heating the stamper 3*b* which is remote from the cooling member 4, almost similar effects as those attained in the first embodiment can be obtained. Further, as compared with the stamper 3 of the first embodiment, which is radiation heated while being in contact with the cooling member 4 (i.e. in the state where the heat of the stamper 3 is absorbed by the cooling member 4) in the transfer step after being radiation heated in the heating step, in this embodiment, the stamper 3*b* is radiation heated in the state where it is remote from the cooling member 4 (i.e. in the state where the heat of the stamper 3*b* is not absorbed by the cooling member 4) only in the heating step, the stamper 3*b* can be heated more effectively.

(Transfer Step)

Subsequently, as shown in FIG. 4(*b*), the molding apparatus 1*b* allows the structure of the shape-forming surface 31 of the radiation heated stamper 3*b* to be transferred to the transfer surface 71 of the base 7 (transfer step). That is, in this transfer step, the shutter 24 is closed and the second mold 6 is lifted up, the transfer surface 71 of the base 7 is brought into contact with the shape-forming surface 31 of the stamper 3*b*, and subsequently, the stamper 3*b* is moved upward in such a manner it is pushed up. In the state where the stamper 3*b* is in contact with the cooling member 4, the transfer surface 71 is pressed against the shape-forming surface 31, whereby the structure of the shape-forming surface 31 is transferred to the transfer surface 71 of the base 7.

In this embodiment, unlike the first embodiment, the stamper 3*b* is not radiation heated in the transfer step. That is, the stamper 3*b* is radiation heated in the heating step, and by utilizing only heat which has been stored by the stamper 3*b* by this radiation heating, the stamper 3b transfers the structure of the shape-forming surface 31 to the transfer surface 71 of the base 7.

Due to such a configuration, in the transfer step, although the cooling member 4 contacts the stamper 3b which has been radiation heated, unlike the first embodiment, the cooling member 4 does not contact the stamper 3b which is being radiation heated. As a result, an increase in temperature of the cooling member 4 can be suppressed more effectively, whereby the cooling time can be further shortened.

Further, it is preferred that, when the second mold 6 is lifted up, the lifting be stopped in the state where the transfer surface 71 of the base 7 is in contact with the shape-forming surface 31 and the stamper 3b is not in contact with the cooling member 4, whereby the transfer surface 71 is subjected to preliminary heating by the heat of the stamper 3b. Thereafter, the stamper 3b may further be lifted to allow the structure of the shape-forming surface 31 to be transferred to the transfer surface 71 of the base 7. In this way, the heat of the stamper 3b can be used effectively.

(Cooling Step)

Subsequently, as shown in FIG. 4(c), in the molding apparatus 1b, in the state where the shape-forming surface 31 is pressed against the transfer surface 71, the cooling member 4 which is in contact with the stamper 3b cools the stamper 3b, thereby to solidify or cure the base 7 (cooling step). That is, in this embodiment, when the stamper 3b is brought into contact with the cooling member 4 in the transfer step, cooling starts. Accordingly, in the transfer step and the cooling step of this embodiment, transfer starts when the transfer surface 71 is brought into contact with the shape-forming surface 31, and cooling starts when the stamper 3b is brought into contact with the cooling member 4. After transfer is completed, cooling is also completed.

Here, the cooling member 4 is in contact with the stamper 3b in the transfer step, and the temperature of the cooling member is elevated by thermal conduction. However, as mentioned above, as compared with the first embodiment, since radiation of infrared rays is not conducted in the transfer step, an increase in temperature by infrared rays does not occur, whereby an increase in temperature can effectively be suppressed. As a result, when the cooling member 4 cools the stamper 3b, the cooling time can be shortened.

Further, since cooling after the transfer can be effectively conducted by the cooling member 4 of which an increase in temperature has been suppressed, occurrence of poor appearance of a molded product (for example, formation of protruded parts or the like) can be prevented, whereby quality can be improved.

(Mold-Releasing Step)

Subsequently, in the molding apparatus 1b, as shown in FIG. 4(d), by releasing the state where the shape-forming surface 31 is pressed against the transfer surface 71, the molded product is removed from the mold (mold-releasing step). That is, in this mold-releasing step, the second mold 6 is lowered, and the stamper 3b is separated from the cooling member 4 and moves downward. Then, when the stamper 3b is engaged with the holder 52, the transfer surface 71 is separated from the shape-forming surface 31, and the second mold 6 is lowered to the original position. Thereafter, the base 7 is transported, whereby the one cycle of molding is completed.

As explained above, according the molding apparatus 1b of this embodiment, almost similar effects as those attained by the molding apparatus 1 of the first embodiment can be attained, and since the stamper 3b is radiation heated only in the heating step, the stamper 3b can be heated more effectively. Further, since an increase in temperature of the cooling member 4 can be suppressed more effectively in the transfer step, the heating time and the cooling time can be further shortened.

[Third Embodiment of the Apparatus for Molding a Thermoplastic Resin Product and the Method for Molding]

Figure 5:
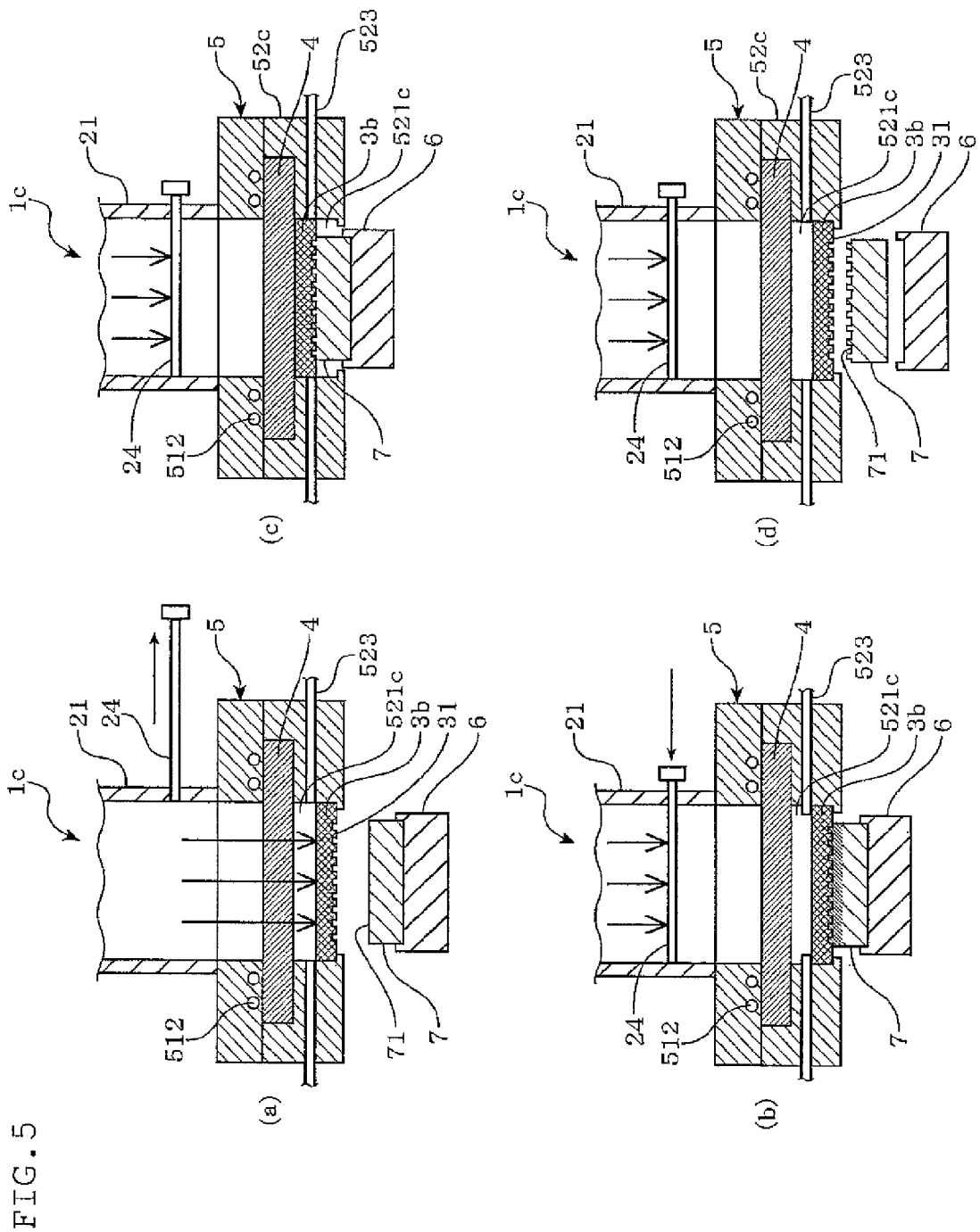
FIG. 5 is a schematic cross-sectional view for explaining an apparatus for molding a thermoplastic resin product and a method for molding a thermoplastic resin product according to a third embodiment of the present invention.

FIG. 5 is a schematic cross-sectional view for explaining an apparatus for molding a thermoplastic resin product and a method for molding a thermoplastic resin product according to a third embodiment of the present invention.

In FIG. 5, in the molding apparatus 1c of this embodiment differs from the molding apparatus 1b of the second embodiment in that it has a plurality of engagement pins 523 which engage with the stamper 3b so that the stamper 3b does not move upward, that transfer is conducted by the stamper 3b in the transfer step which is held in the state where it is remote from the cooling member 4, and the like. Other configurations of this embodiment are almost similar to those of the molding apparatus 1b.

Therefore, in FIG. 5, constituting elements which are similar to those in FIG. 4 are indicated by the same referential numerals, and a detailed explanation is omitted.

As mentioned above, since the stamper 3b has a thickness of 1 several mm to several mm, and hence has a high mechanical strength. Therefore, even if transfer is conducted in the state where the edge part of the stamper 3b is engaged with the engagement pin 523 instead of being in contact with the cooling member 4, a disadvantage that the stamper 3b is deformed can be prevented, and hence, lowering in transfer accuracy and the like does not occur.

In this embodiment, the stamper 3b is held in the state where it is remote from the cooling member 4 by the engagement pin 523 and the second mold 6. The configuration is, however, not limited thereto. For example, though not shown, a configuration is possible in which the stamper 3b is secured and the cooling member 4 is moved up and down.

(Engagement Pin)

The engagement pin 523 is buried in a holder 52c such that it can be moved reciprocally. If its front end part is protruded into a gap 521c by means of an air cylinder or the like, the engagement pin 523 engages with the stamper 3b which is lifted up.

The holder 52c has a shape in which the thickness of the gap 521c (distance in the vertical direction) is several mm. Other configurations of the holder 52c are almost similar to those of the holder 52.

Next, the operation of a molding apparatus 1c with the above-mentioned configuration and the third embodiment of the method for molding a thermoplastic resin product and the like will be explained.

In FIG. 5, the method for molding a thermoplastic resin product of this embodiment is a molding method in which compression molding is conducted for the base 7 by means of the molding apparatus 1c. This method includes a heating step, a transfer step, a cooling step and a mold-releasing step.

(Heating Step)

First, as shown in FIG. 5(a), in the molding apparatus 1c, the shutter 24 is opened, and the stamper 3b which is remote from the cooling member 4 is radiation heated with infrared rays emitted from a heating apparatus 2 to a temperature at which there is no need to conduct radiation heating in the transfer step (heating step). Due to such a configuration, almost similar effects as those attained by the second embodiment can be attained.

As for the engagement pin 523, the edge surface thereof is located at a position which is in correspondence with the inner surface of the gap 521c, and hence almost no adverse effects are exerted on the uniform radiation of infrared rays.

(Transfer Step)

Subsequently, as shown in FIG. 5(*b*), the molding apparatus 1c allows the structure of the shape-forming surface 31 of the radiation heated stamper 3b to be transferred to the transfer surface 71 of the base 7 (transfer step). That is, in this transfer step, the shutter 24 is closed, the front end part of engagement pin 523 is protruded into a holder 521c, the second mold 6 is lifted up, the transfer surface 71 of the base 7 is brought into contact with the stamper 3b, and subsequently, the stamper 3b is moved upward in such a manner it is pushed up (normally, this distance of this movement is small). When the stamper 3b is engaged with the engagement pin 523, the stamper 3b is held in the state where it is remote from the cooling member 4, and in this state, the transfer surface 71 is pressed against the shape-forming surface 31, whereby the structure of the shape-forming surface 31 is transferred to the transfer surface 71 of the base 7.

Here, in this embodiment, as in almost the same manner as in the second embodiment, the structure of the shape-forming surface 31 is transferred to the transfer surface 71 of the base 7 by utilizing only heat which has been stored by the stamper 3b in the heating step. As a result, an increase in temperature of the cooling member 4 can be suppressed more effectively, and the cooling time can be further shortened. Further, as compared with the second embodiment, since the stamper 3b is not in contact with the cooling member 4 in the transfer step, only a small amount of heat is flown from the stamper 3b to the cooling member 4. Therefore, an amount of heat stored in the stamper 3b in the heating step becomes small, whereby the heating time is shortened.

In this embodiment, the stamper 3b is not radiation heated in the transfer step. The manner is, however, not limited thereto. For example, although not shown, the stamper 3b may be radiation heated.

(Cooling Step)

Subsequently, as shown in FIG. 5(*c*), in the molding apparatus 1c, in the state where the shape-forming surface 31 is pressed against the transfer surface 71, the cooling member 4 which is in contact with the stamper 3b cools the stamper 3b, thereby solidifying or cooling the base 7 (cooling step). That is, in this embodiment, the engagement pin 523 is returned to a position at which the edge surface thereof is located at a position corresponding to the inner surface of the gap 521c, the second mold 6 is lifted up, the stamper 3b is move upward in such a manner that it is pushed up, the stamper 3b is in contact with the cooling member 4, whereby the stamper 3b is cooled.

Here, the cooling member 4 does not contact the stamper 3b in the transfer step. As a result, an increase in temperature can be suppressed effectively, whereby the cooling time can be shortened.

(Mold-Releasing Step)

Subsequently, in the molding apparatus 1c, as shown in FIG. 5(*d*), by releasing the state where the shape-forming surface 31 is pressed against the transfer surface 71, the molded product is removed from the mold (mold-releasing step). That is, in this mold-releasing step, the second mold 6 is lowered, and the stamper 3b is separated from the cooling member 4 and moves downward. Then, when the stamper 3b is engaged with the holder 52c, the transfer surface 71 is separated from the shape-forming surface 31, and the second mold 6 is lowered to the original position. Thereafter, the base 7 is transported, whereby the one cycle of molding is completed.

As explained above, according the molding apparatus 1c of this embodiment, almost similar effects as those attained by the molding apparatus 1b of the second embodiment can be attained, and since the cooling member 4 does not contact the stamper 3b in the transfer step, an increase in temperature of the cooling member 4 can be suppressed effectively, whereby the cooling time can be shortened. Further, since an amount of heat stored in the stamper 3b step becomes small, the heating time can be shortened.

This embodiment can be applied to the first and second embodiments.

[Fourth Embodiment of the Apparatus for Molding a Thermoplastic Resin Product and the Method for Molding]

Figure 6:
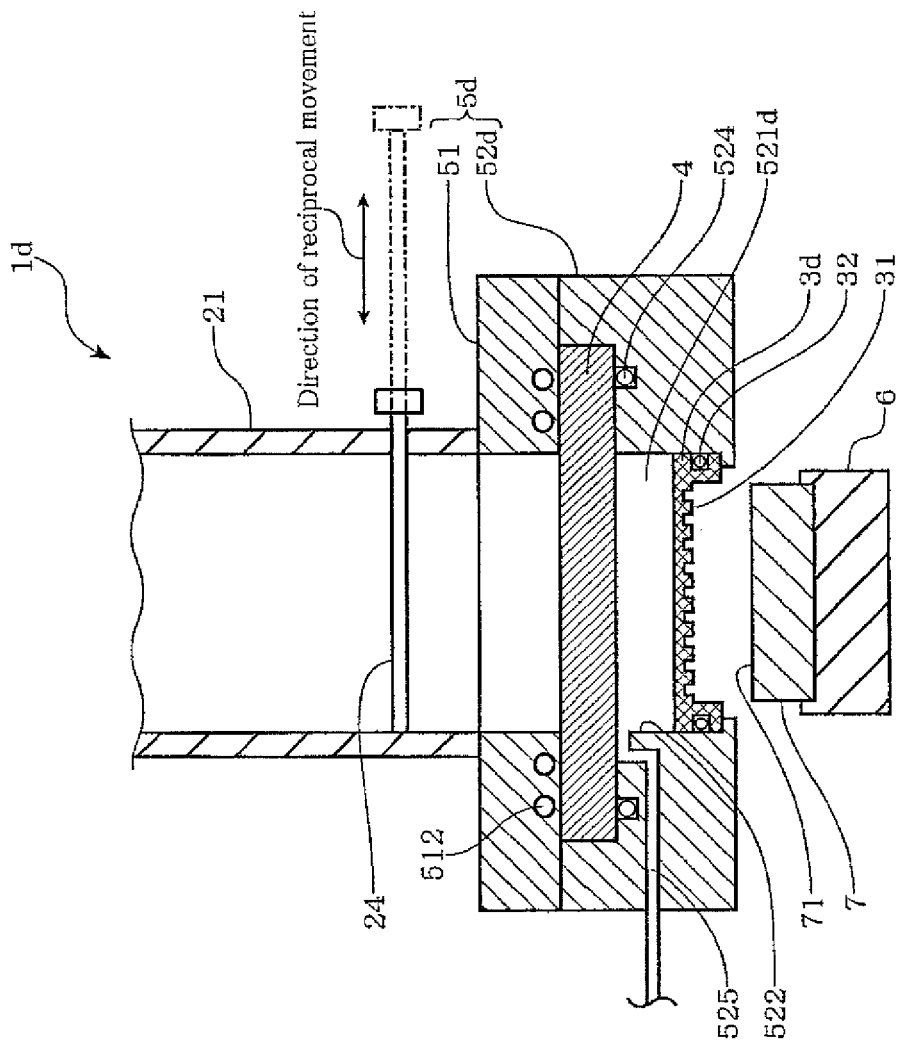
FIG. 6 is a schematic enlarged cross-sectional view of essential parts for explaining an apparatus for molding a thermoplastic resin product according to a fourth embodiment of the present invention.

FIG. 6 is a schematic enlarged cross-sectional view of essential parts for explaining an apparatus for molding a thermoplastic resin product according to a fourth embodiment of the present invention.

In FIG. 6, a molding apparatus 1d of this embodiment differs from the molding apparatus 1 of the first embodiment in that a stamper 3d is held in the state where it is remote from the cooling member 4 by applying a pressure to a gape 521d between the cooling member 4 and the stamper 3d in the transfer step, that transfer is conducted by the stamper 3d, and the like. Other configurations of this embodiment are almost similar to those of the molding apparatus 1.

Therefore, in FIG. 6, constituting elements which are similar to those in FIG. 1 are indicated by the same referential numerals, and a detailed explanation is omitted.

(Stamper)

A stamper 3d of this embodiment differs from the stamper 3 of the first embodiment in that the stamper 3d has, in the lower part of its periphery, a ring-like part in which an O-ring groove for accommodating an O-ring 32 is formed, and the like. Other configurations of the stamper 3d are almost similar to those of the stamper 3.

Due to such a configuration, in the stamper 3d, the lower space, at which the second mold 6 is positioned, and a gap 521d between the cooling member 4 and the stamper 3d are sealed by the O-ring 32, whereby the pressure inside the gap 521d is allowed to be higher than the pressure inside the lower space. The stamper 3d can be moved vertically in the sealed state along a guide surface 522.

The above-mentioned ring-like part is normally integrally formed with a plate-like part of the stamper 3d (the "plate-like part" mainly means a part which is nearer to the center of the stamper than the periphery of the stamper). The configuration is, however, not limited thereto, and, for example, a ring-like member formed of a material having excellent heat insulating properties may be bonded to the plate-like part.

(First Mold)

A first mold 5d differs from the first mold 5 of the first embodiment in that a holder 52d is provided with a pressure control channel 525 and an O-ring 524, and the like. Other configurations of the first mold 5d are almost similar to those of the first mold 5.

In the holder 52d, in order to control the pressure inside the gap 521d, the pressure control channel 525 is formed. Although not shown, this pressure control channel 525 is intercommunicated with a pressure source such as factory air and open air for releasing an atmospheric pressure through a pipe, a valve and the like. In the holder 52d, on the surface on which the cooling member 4 is mounted, an O-ring groove for accommodating the O-ring 524 is formed, and the upper part of the gap 521d is sealed by the O-ring 524.

The thickness of the gap 521d (the distance in the vertical direction) is normally several mm.

Next, the operation of a molding apparatus 1d with the above-mentioned configuration and the fourth embodiment of the method for molding a thermoplastic resin product and the like will be explained.

Figure 7:
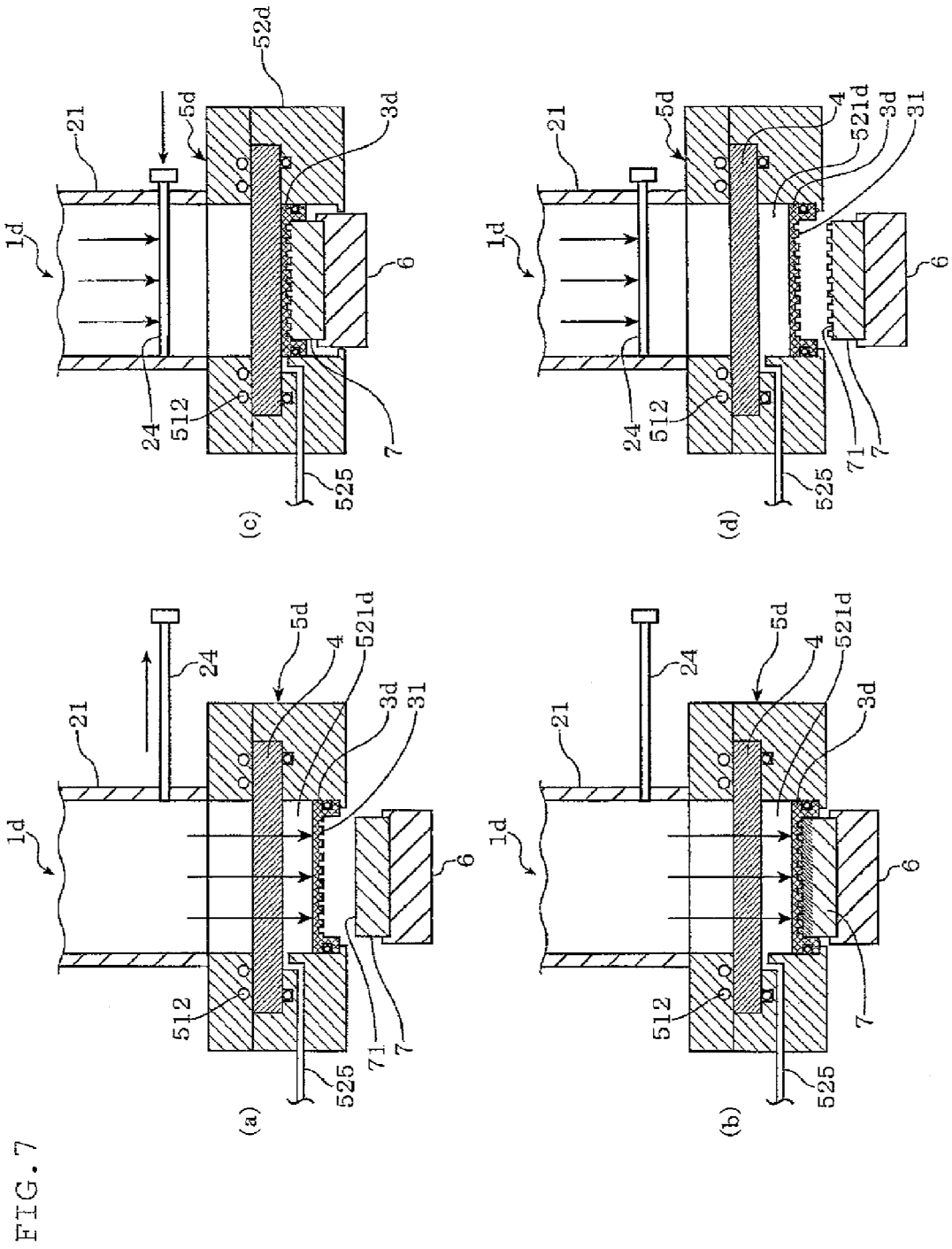
FIG. 7 is a schematic cross-sectional view for explaining a method for molding a thermoplastic resin product according to the fourth embodiment of the present invention.

FIG. 7 is a schematic cross-sectional view for explaining a method for molding a thermoplastic resin product according to the fourth embodiment of the present invention.

In FIG. 7, the method for molding a thermoplastic resin product of this embodiment is a molding method in which compression molding is conducted for the base 7 by means of a molding apparatus 1d. This method includes a heating step, a transfer step, a cooling step and a mold-releasing step.

(Heating Step)

At first, a molding apparatus 1d is in the state shown in FIG. 6, i.e. the state in which the pressure inside the gap 521d is released to the open air. Then, as shown in FIG. 7(a), the shutter 24 is opened, and infrared rays emitted from the heating apparatus 2 radiation heat the stamper 3d which is remote from the cooling member 4 (heating step).

In this way, by radiation heating the stamper 3d which is remote from the cooling member 4, as in almost the same manner as in the first embodiment, thermal conduction from the stamper 3d to the cooling member 4 is not conducted. As a result, the stamper 3d can be heated effectively, whereby the heating time can be shortened. Further, in this embodiment, heating is conducted also in the transfer step mentioned later. However, in this case, the stamper 3d is heated in advance, whereby the heating time in the transfer step can be shortened.

(Transfer Step)

Subsequently, as shown in FIG. 7(b), the molding apparatus 1d allows the structure of the shape-forming surface 31 of the radiation heated stamper 3d to be transferred to the transfer surface 71 of the base 7 (transfer step). That is, in this transfer step, in the state where the stamper 3d which is remote from the cooling member 4 is radiation heated, the second mold 6 is lifted up as mold shaping, and the transfer surface 71 of the base 7 is brought into contact with the shape-forming surface 31 of the stamper 3d.

At this time, in the molding apparatus 1d, simultaneously with, or immediately before, or immediately after the contact of the transfer surface 71 of the base 7 with the shape-forming surface 31 of the stamper 3d, a fluid such as factory air is supplied to the gap 521d through the pressure control channel 525. As a result, a pressure higher than the atmospheric pressure is applied to the gap 521d between the cooling member 4 and the stamper 3d, and the stamper 3d is held in the state where it is remote from the cooling member 4. In this state, the transfer surface 71 is pressed against the shape-forming surface 31, whereby the structure of the shape-forming surface 31 is transferred to the transfer surface 71 of the base 7.

Here, in this embodiment, the thickness of the stamper 3d is several hundreds μm. Although the mechanical strength is small, since the transfer surface 71 is pressed against the shape-forming surface 31 almost uniformly by the pressure inside the gap 521d, a disadvantage that the stamper 3d is deformed can be prevented, whereby transfer accuracy and the like can be improved.

Further, in this embodiment, also in the transfer step, the stamper 3d is radiation heated. Since the stamper 3d is radiation heated in the state where it is remote from the cooling member 4, i.e. in the state where the heat of the stamper 3d is not absorbed by the cooling member 4, the stamper 3d can be heated more effectively. Further, the cooling member 4 does not contact the stamper 3d which is being radiation heated. As a result, an increase in temperature of the cooling member 4 can be suppressed, whereby the cooling time can be shortened in the cooling step.

In this embodiment, a pressure higher than the atmospheric pressure is applied to the gap 521d. It suffices that the pressure inside the gap 521d be a pressure which is higher than the pressure of the lower space at which the second mold 6 is located, and enables the stamper 3d to be held in the state where it is remote from the cooling member 4, and enables the transfer surface 71 to be pressed against almost uniformly to the shape-forming surface 31 by the pressure inside the gap 521d. Therefore, a pressure to be applied to the gap 521d is not limited to a pressure which is higher than the atmospheric pressure. For example, if the lower space in which the second mold 6 is located is vacuumed, the pressure may be the atmospheric pressure or a pressure which is lower than the atmospheric pressure.

After applying a pressure which is higher than the atmospheric pressure to the gap 521d, a valve (not shown) connected to a pressure control channel 525 is closed, thereby allowing the gap 521d to be a sealed space. In this case, according to a prescribed thrust of a pressing machine, the stamper 3d is lifted, and when the power generated by the pressure inside the gap 521d is balanced with the thrust of the pressing machine, the stamper 3d is stopped.

(Cooling Step)

Subsequently, as shown in FIG. 7(c), in the molding apparatus 1d, in the state where the shape-forming surface 31 is pressed against the transfer surface 71, the cooling member 4 which is in contact with the stamper 3d cools the stamper 3d, thereby to solidify or cure the base 7 (cooling step). That is, in this embodiment, the shutter 24 is closed, the pressure inside the gap 521d is released to the open air, the second mold 6 is lifted up, the stamper 3d is brought into contact with the cooling member 4, and the stamper 3d is cooled.

Here, since the cooling member 4 does not contact the stamper 3d in the transfer step, an increase in temperature can be effectively suppressed, whereby the cooling time can be shortened.

Further, since cooling after the transfer can be conducted effectively by the cooling member 4, of which the temperature elevation has been suppressed, occurrence of poor appearance of a molded product (for example, formation of protruded parts or the like) can be prevented, whereby quality can be improved.

(Mold-Releasing Step)

Subsequently, in the molding apparatus 1d, as shown in FIG. 7(d), by releasing the state where the shape-forming surface 31 is pressed against the transfer surface 71, the molded product is removed from the mold (mold-releasing step). That is, in this mold-releasing step, the second mold 6 is lowered, and the stamper 3d is separated from the cooling member 4 and moves downward. Then, when the stamper 3d is engaged with the holder 52d, the transfer surface 71 is separated from the shape-forming surface 31, and the second mold 6 is lowered to the original position. Thereafter, the base 7 is transported, whereby the one cycle of molding is completed.

As explained above, according the molding apparatus 1d of this embodiment, almost similar effects as those attained by the molding apparatus 1 of the first embodiment can be attained, and since the cooling member 4 is remote from the stamper 3d in the transfer step, absorption of heat of the stamper 3d by the cooling member 4 can be prevented, the heating time, the transfer time and the cooling time can be shortened.

This embodiment can be applied to the first and second embodiments.

[Fifth Embodiment of the Apparatus for Molding a Thermoplastic Resin Product and the Method for Molding]

Figure 8:
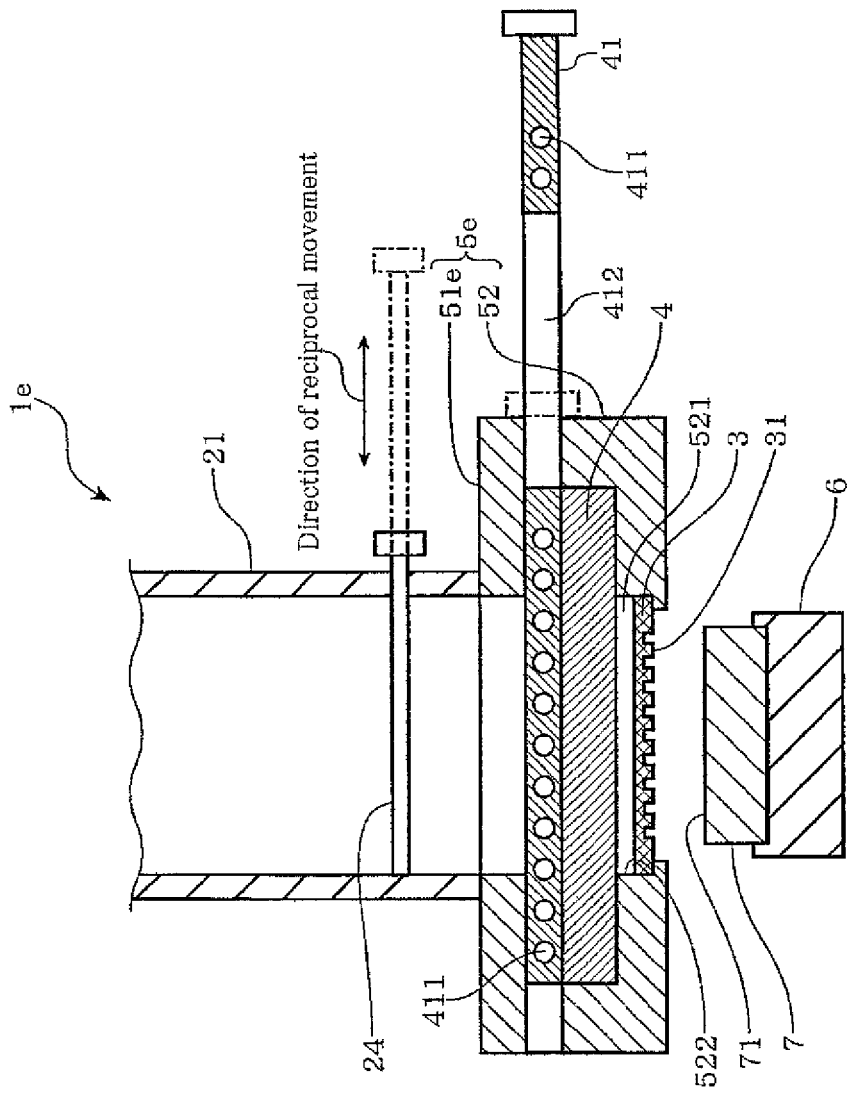
FIG. 8 is a schematic enlarged cross-sectional view of essential parts for explaining an apparatus for molding a thermoplastic resin product according to a fifth embodiment of the present invention.

FIG. 8 is a schematic enlarged cross-sectional view of essential parts for explaining an apparatus for molding a thermoplastic resin product according to a fifth embodiment of the present invention.

In FIG. 8, a molding apparatus 1e of this embodiment differs from the molding apparatus 1 of the first embodiment in that it is provided with a forced cooling plate 41 which forcedly cools the cooling member 4, and the like. Other configurations and the like of this embodiment are almost similar to those of the molding apparatus 1.

Therefore, in FIG. 8, constituting elements which are similar to those in FIG. 1 are indicated by the same referential numerals, and a detailed explanation is omitted.

(First Mold)

A first mold 5e differs from the first mold 5 in the first embodiment in that a concave part is formed in the bottom part 51e, and that a forced cooling plate 41 (mentioned later) is movably attached to this concave part, and the like. Other configurations and the like of the first mold 5e are almost similar to those of the first mold 5.

(Forced Cooling Plate)

The forced cooling plate 41 is formed of a material which is improved in thermal conductivity, such as aluminum and copper, and has a square flat plate shape which enables the cooling member 4 to be covered. The forced cooling plate 41 is provided in a concave part of the base part 51e in a horizontally movable manner. In almost the middle part thereof, this forced cooling plate 41 has an opening 412 having an almost similar shape as the cross section of the light pipe 21. On the both sides of the opening 412 (in FIG. 8, on the left side and the right side of the opening 412), a channel 411 for flowing a coolant is formed.

The side surface of the opening part 412 has a mirror surface. When the opening part 412 moves to a position corresponding to the light pipe 21 in the heating and transfer steps, the opening part 412 functions almost similarly as the light pipe 21. Therefore, light from a light source 23 can be uniformly radiated on the upper surface of the stamper 3, whereby the stamper 3 can be uniformly heated.

Further, as for a part on the left side of the opening part 412 in which a channel 411 is arranged, when it is moved to a position at which the cooling member 4 is covered in the cooling and mold-releasing steps, it is brought into contact with the upper surface of the cooling member 4. Therefore, the cooling member 4 can be efficiently cooled while keeping the temperature distribution of the cooling member 4 almost uniformly.

In this embodiment, one forced cooling plate 41 is used. The number of the forced cooling plate 41 is not limited to one. For example, a plurality of forced cooling plates 41 may be prepared, and the forced cooling plates 41 which have been sufficiently cooled may be used sequentially. By doing this, even if molding is conducted continuously, effective cooling can be conducted without fail.

Further, since the forced cooling plate 41 shields light from the light source 23, it also has a function as the shutter 24. Therefore, it may be used instead of the shutter 24.

Next, the operation of a molding apparatus 1e with the above-mentioned configuration and the fourth embodiment of the method for molding a thermoplastic resin product and the like will be explained.

Figure 9:
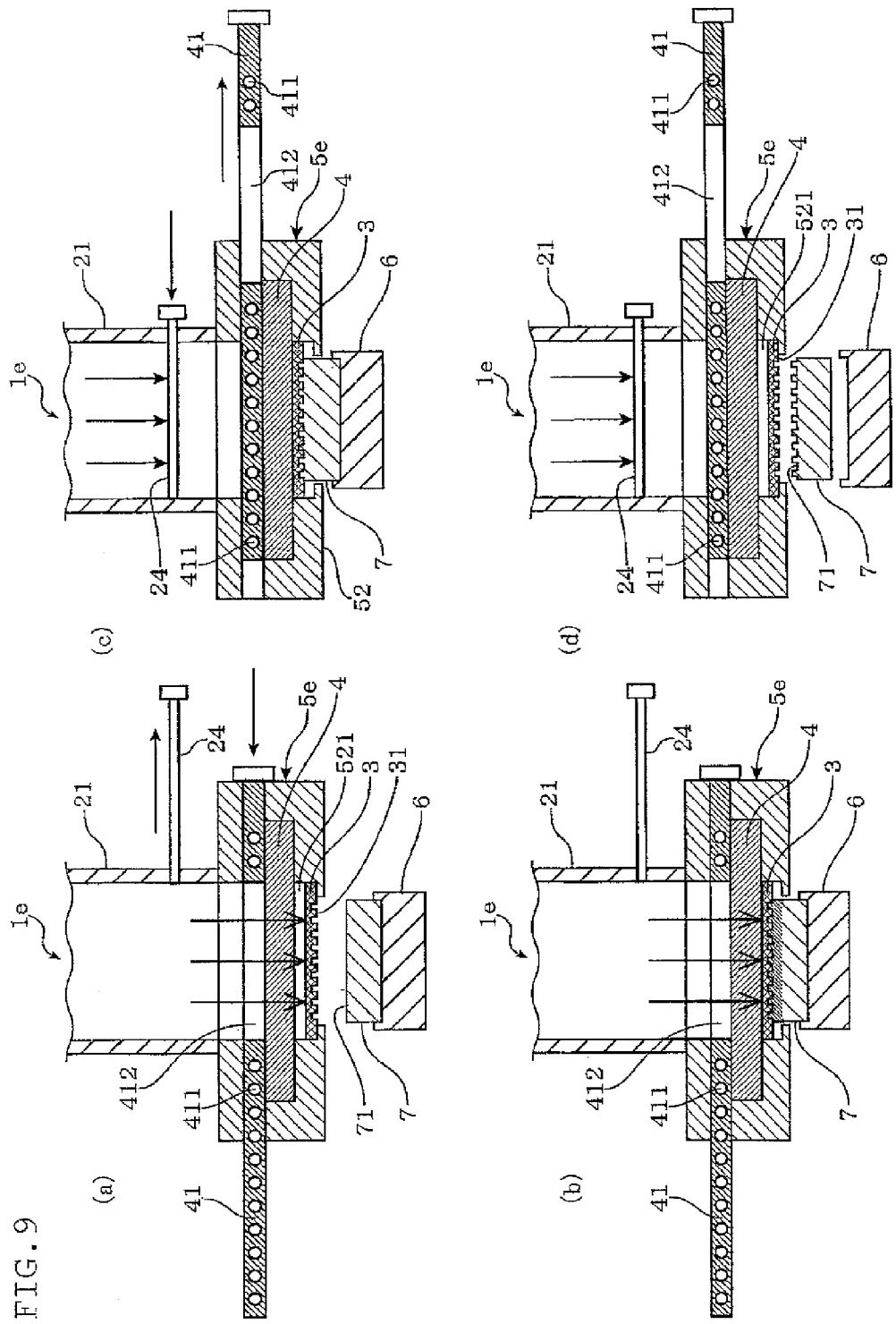
FIG. 9 is a schematic cross-sectional view for explaining a method for molding a thermoplastic resin product according to the fifth embodiment of the present invention.

FIG. 9 is a schematic cross-sectional view for explaining a method for molding a thermoplastic resin product according to the fifth embodiment of the present invention.

In FIG. 9, the method for molding a thermoplastic resin product of this embodiment is a molding method in which compression molding is conducted for the base 7 by means of a molding apparatus 1e. This method includes a heating step, a transfer step, a cooling step and a mold-releasing step.

(Heating Step)

At first, a heating apparatus 1e is in the state shown in FIG. 8, i.e. the state where the shutter 24 is closed and a part on the left part of the forced cooling plate 41 covers the cooling member 4. Then, as shown in FIG. 9(a), the forced cooling plate 41 is moved to a position at which the opening part 412 corresponds to the light pipe 21, and the shutter 24 is opened, and infrared rays radiated from the heating apparatus 2 radiation heat the stamper 3 which is remote from the cooling member 4 (heating step).

In this way, by radiation heating the stamper 3 which is remote from the cooling member 4, thermal conduction from the stamper 3 to the cooling member 4 is not conducted almost as in the case of the first embodiment, the stamper 3 can be heated effectively. Further, infrared rays pass through the opening part 412, and the cooling member 4 allows the infrared rays to be transmitted. As a result, heating can be conducted efficiently, and heating time can be shortened. Further, in this embodiment, heating is also conducted in the transfer step mentioned later. In this case, the stamper 3 is heated in advance, whereby heating time in the transfer step can be shortened.

(Transfer Step)

Subsequently, as shown in FIG. 9(b), in a molding apparatus 1e, the structure of the shape-forming surface 31 of the stamper 3 which has been radiation heated is transferred to the transfer surface 71 of the base 7 (transfer step). That is, in this transfer step, the second mold 6 is lifted up as mold shaping, the transfer surface 71 of the base 7 is brought into contact with the shape-forming surface 31 of the stamper 3, and subsequently, the stamper 3 is moved upward in such a manner it is pushed up. In the state where the stamper 3 is in contact with the cooling member 4, the transfer surface 71 is pressed against the shape-forming surface 31, whereby the structure of the shape-forming surface 31 is transferred to the transfer surface 71 of the base 7.

In this embodiment, the thickness of the stamper 3 is several hundreds μm. Due to the small mechanical strength, the transfer is conducted in the state where the cooling member 4 is in contact with the stamper 3. As a result, a disadvantage that the stamper 3 is deformed can be prevented, whereby transfer accuracy and the like can be improved.

Further, in this embodiment, in the transfer step, the stamper 3 is radiation heated. That is, in the molding apparatus 1, as shown in FIG. 9(b), the shutter 24 is opened, and the forced cooling plate 41 is moved to a position where the opening part 412 corresponds to the light pipe 21. Infrared rays emitted from the heating apparatus 2 radiation heat the stamper 3 which is in contact with the cooling member 4. By this, since the stamper 3 is radiation heated also in the transfer step, a thermoplastic resin of the transfer surface 71 of the base 7 or its vicinity can be molten or softened, whereby the structure of the shape-forming surface 31 of the stamper 3 is transferred to the transfer surface 71 of the base 7.

(Cooling Step)

Subsequently, as shown in FIG. 9(c), in the molding apparatus 1e, in the state where the shape-forming surface 31 is pressed against the transfer surface 71, the cooling member 4 which is in contact with the stamper 3 cools the stamper 3, thereby to solidify or cure the base 7 (cooling step). That is, in this embodiment, the shutter 24 is closed, and the forced cooling plate 41 is moved to a position where a part on the left side of the forced cooling plate 41 covers the cooling member 4, the second mold 6 is lifted up, the stamper 3 is brought into contact with the cooling member 4, and the stamper 3 is cooled.

Here, the cooling member 4 can be efficiently cooled by the forced cooling plate 41, while keeping the temperature distribution of the cooling member 4 almost uniformly. Therefore, the cooling time can be further shortened.

Further, since cooling after the transfer can be conducted effectively by the cooling member 4, of which the temperature elevation has been suppressed, occurrence of poor appearance of a molded product (for example, formation of protruded parts or the like) can be prevented, whereby quality can be improved.

(Mold-Releasing Step)

Subsequently, in the molding apparatus 1e, as shown in FIG. 9(d), by releasing the state where the shape-forming surface 31 is pressed against the transfer surface 71, the molded product is removed from the mold (mold-releasing step). That is, in this mold-releasing step, the second mold 6 is lowered, and the stamper 3 is separated from the cooling member 4 and moves downward. Then, when the stamper 3 is engaged with the holder 52, the transfer surface 71 is separated from the shape-forming surface 31, and the second mold 6 is lowered to the original position. Thereafter, the base 7 is transported, whereby the one cycle of molding is completed.

As explained above, according the molding apparatus 1e according to this embodiment, almost similar effects as those attained by the molding apparatus 1 of the first embodiment can be attained, and since the cooling member 4 can be efficiently cooled by the forced cooling plate 41 while keeping the temperature distribution of the cooling member 4 almost uniformly, the cooling time can be further shortened. Further, by the cooling member 4 of which the temperature elevation has been suppressed, occurrence of poor appearance of a molded product (for example, formation of protruded parts or the like) can be prevented, whereby quality can be improved.

In this embodiment, the cooling member 4 is forcedly cooled by the forced cooling plate 41. In each of the above-mentioned embodiments, forced cooling may be conducted by using the forced cooling plate 41 instead of the channel 512 for allowing a coolant to flow.

EXAMPLES

As an example of the first embodiment, uneven shapes were formed on the base 7 by the above-mentioned molding method.

The base 7 was formed of polystyrene and had a square shape (the length of a side is 58 mm and the plate thickness is 3 mm).

The heating apparatus 2 had a rectangular parallolpiped having a square irradiation port of the light box 22 (the surface where the irradiance is measured) (the length of one side is 70 mm) and a length of 150 mm. The light source 23 was obtained by arranging five rod-like halogen heaters (output of one heater: 1.5 kW) in a direction parallel with the length direction. The inner surface 22 of the light box had a total reflective index of 95%.

The cooling member 4 was made of sapphire.

The stamper 3 was made of Ni (nickel), and as the shape-forming surface 31, convex patterns having a height of 50 μm, a width of 50 μm and a length of 2 mm were formed at an interval of 100 μm.

Further, as a pressing machine, a low-pressure pressing machine (pressing thrust: 10 kN) was used.

In the molding apparatus 1, in the heating step, radiation heating was conducted for 1.0 second. In the transfer step, radiation heating was conducted for 2.5 seconds. In the cooling step, cooling was conducted for 5.0 seconds.

The base 7, which had been molded, could be released from the mold almost automatically, showing good mold releasability. The transfer ratio of the concave pattern was 96%. The cycle time was about 8.5 seconds. That is, fine patterns could be transferred with a high degree of accuracy, and productivity could be improved significantly.

Comparative Example

The comparative example differs from the above-mentioned example in that the stamper 3 was secured in the state where it was in contact with the cooling member 4, that the heating step was omitted, and radiation heating was conducted in the transfer step in the state where the base 7 was in contact with the stamper 3, and that radiation heating was conducted for 5.0 seconds in the transfer step and cooling was conducted for 5.0 seconds or 60.0 seconds in the cooling step. Other methods of the comparative example were almost similar to those of the example.

Of the bases 7 molded in the comparative example, as for one for which cooling was conducted for 5.0 seconds, a protruded part (poor appearance) was formed in the middle, although it could be released from the mold. Therefore, this base could not be applied to an actual product. Regarding one for which cooling was conducted for 60.0 seconds, although poor appearance was not observed, it could not be applied to actual production for which high productivity and the like are required.

[Heating Apparatus and Heating Method]

Next, the above-mentioned heating apparatus 2 and the like will be explained with reference to the drawings.

Figure 10:
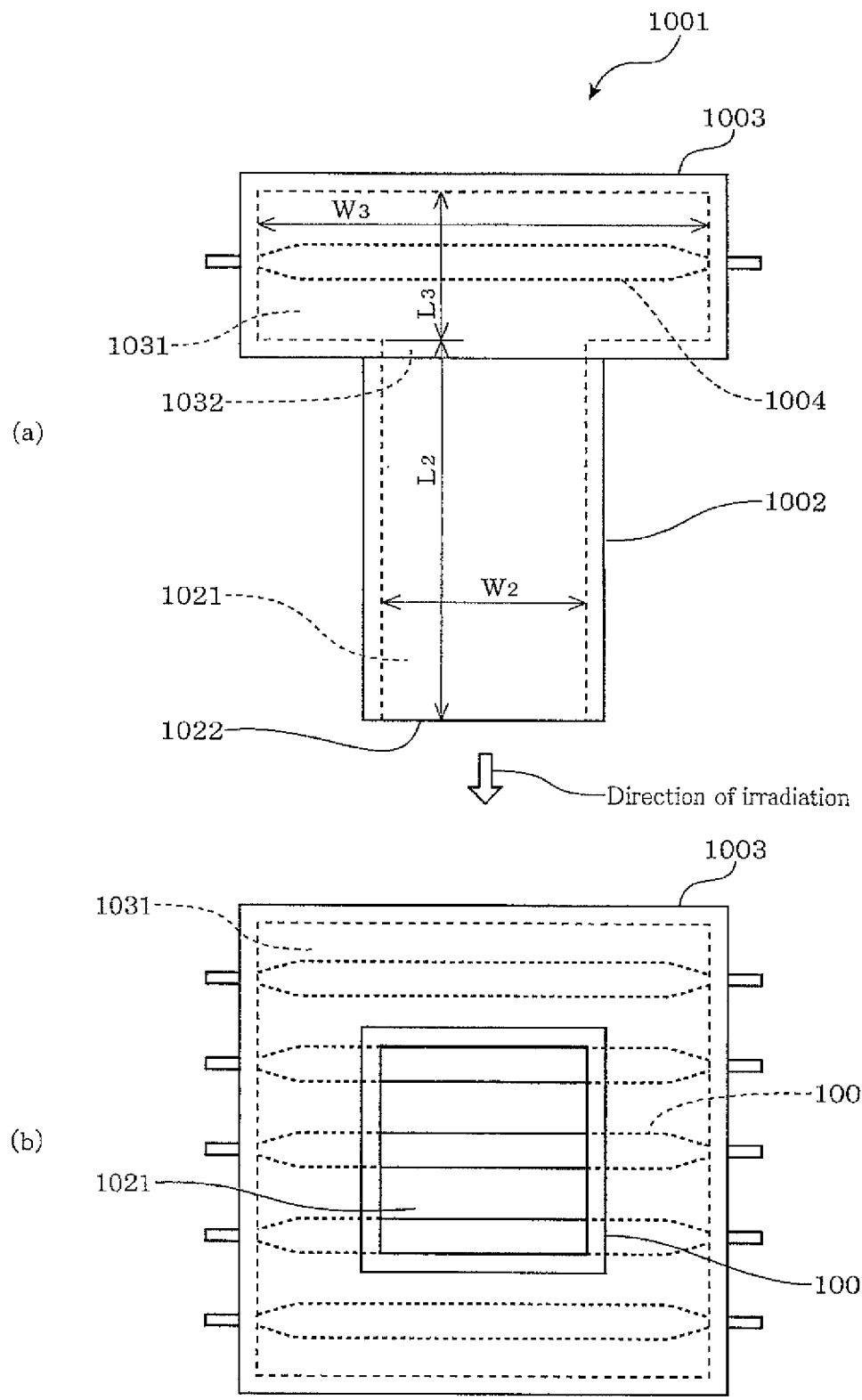
FIG. 10 is a schematic view for explaining a heating apparatus used in the present invention, in which (a) is a front view and (b) is a bottom view.

FIG. 10 is a schematic view for explaining the heating apparatus used in the present invention, in which (a) is a front view and (b) is a bottom view. In FIG. 10, the above-mentioned heating apparatus 2 is indicated as a heating apparatus 1001.

In FIG. 10, the heating apparatus 1001 (that is, the above-mentioned heating apparatus 2) is provided with a light pipe 1002 having a square cross section, a light box 1003 which is connected with the light pipe 1002 and has a square cross section, and a light source 1004 which is accommodated within the light box 1003.

This heating apparatus 1001 heats an object to be irradiated (not shown) by light (including infrared rays or the like) irradiated from the light source 1004.

(Light Source)

The light source 1004 is a light source of infrared rays, such as a halogen lamp, and is capable of conducting radiation heating effectively.

As the light source 1004, five rod-like halogen lamps are arrange in parallel at a almost same interval within the light box 1003. That is, the light source 1004 is a rod-like halogen light, and the irradiation axis of light radiated from the irradiation port 1022 of the light pipe 1002 is orthogonally crossing the longitudinal direction of the rod-like halogen lamp.

The light source 1004 is not limited to the halogen lamp. For example, the light source may be one which can conduct radiation heating. Further, the shape, the quantity, the installation direction, the output and the like of the light source 1004 are not particularly limited, and can be arbitrary selected according to an object to be irradiated, heating temperature or the like.

(Light Box)

The light box 1003 has a box-like shape having a square cross section, and is formed of a plate-like member having a mirror surface on its inside (for example, a steel plate in which silver plating or the like is provided on the surface serving as the inner surface). The cross-sectional shape is a shape of a cross section which crosses orthogonally with the illumination axis.

This light box 1003 has an internal space 1031 which is almost a rectangular parallelopipe. The internal space 1031 has a square bottom surface (the length of the one side is $W_3$), and has a height of $L_3$. In the light box 1003, in the middle of the one side (the lower side in FIG. 10(*a*)), an opening part 1032 is provided, and the opening part 1032 has a square shape (the length of one side is $W_2$).

The light box 1003 is connected to the light pipe 1002 through the opening 1032 such that it is intercommunicated with the light pipe 1002.

As mentioned above, the light box 1003 accommodates the light source 1004 in its inside. That is, the five rod-like halogen lamps are arranged at an almost equal interval at an almost middle position of the height direction of the internal space 1031.

No specific restrictions are imposed on the above-mentioned dimensions $W_3$ and $L_3$, as long as they are the dimensions capable of accommodating the light source 1004, and can be appropriately set. Therefore, it may be $L_3 > W_3$, for example. Further, the light source 1004 may be provided on one of the sides in the height direction of the internal space 1031 (the upper side or the lower side in FIG. 10(*a*)).

Here, the light box 1003 is a box-shape having a square cross section (the bottomed box shape). Therefore, infrared rays radiated from the light source 1004 pass through the opening part 1032 and enter the light pipe 1002 with its part being not reflected by the mirror surface.

Other infrared rays pass the opening part 1032 after once or twice or more of reflection by the mirror surface, and then enter the light pipe 1002. The infrared rays are reflected by the mirror surface which is a rectangular parallelopipe (mirror surface corresponding to the internal space 1031), pass through the opening part 1032 in the uniformed state (called "premixed state"), and enter the light pipe 1002. As a result, the heating apparatus 1001 enables the opening part 1032 to be irradiated with the infrared rays in the uniformed state (called "premixed state").

The cross sectional shape of the light box 1003 is square. The cross sectional shape is, however, not limited thereto. For example, it may be a polygonal shape. Due to such a shape of the cross section, as compared with the case where the cross section is circular, a disadvantage that infrared rays are concentrated in the middle of the opening 1032 (or in the vicinity of the middle) can be eliminated, and as a result, the opening 1032 can be irradiated with infrared rays in the uniformed state.

Further, the cross section of the light box 1003 may preferably be a shape which enables the operation principle of the light pipe to be preferably realized (i.e. a triangle, a square, a regular hexagon, a parallelohexagon, or the like). Due to such a shape of the cross section, as compared with a case where the cross section has a polygonal shape (a polygon excluding a triangle, a square, a regular hexagon, a parallelohexagon or the like), the opening part 1032 can be irradiated with infrared rays in the more uniformed state.

As for the shape which can preferably realize the operation principle of the light pipe, an explanation will be made later.

(Light Pipe)

The light pipe 1002 is a cylindrical shape having a square cross section (a cylindrical shape with the both ends being open), and is formed of a plate-like member having a mirror surface on its inside (for example, a steel plate in which silver plating or the like is provided on the surface serving as the inner surface). The light pipe 1002 is normally a hollow mirror body. The light pipe 1002 is, however, not limited thereto. For example, the light pipe 1002 may be a solid transparent body. Further, the cross-sectional shape is a shape of the cross section which crosses orthogonally with the illumination axis.

This light pipe 1002 has an appropriately rectangular parallelopiped inner space 1021. The internal space 1021 has a square bottom surface (the length of one side is $W_2$) and has a height of $L_2$. The light pipe 1002 is connected with the light box 1003 such that one end part (an upper end part in FIG. 10(*a*)) corresponds to the opening part 1032.

The relationship $W_3$ and $W_2$ is $W_3 > W_2$. However, the relationship is not limited thereto. It may be $W_3 \leq W_2$. The above-mentioned relationship $W_2$ and $L_2$ may appropriately be set. Therefore, the relationship may be $W_2 > L_2$, for example.

<Operation Principle of Light Pipe>

The shape and the like of the light pipe that enable the operation principle of the light pipe to be preferably realized will be explained with reference to the drawings.

Figure 11:
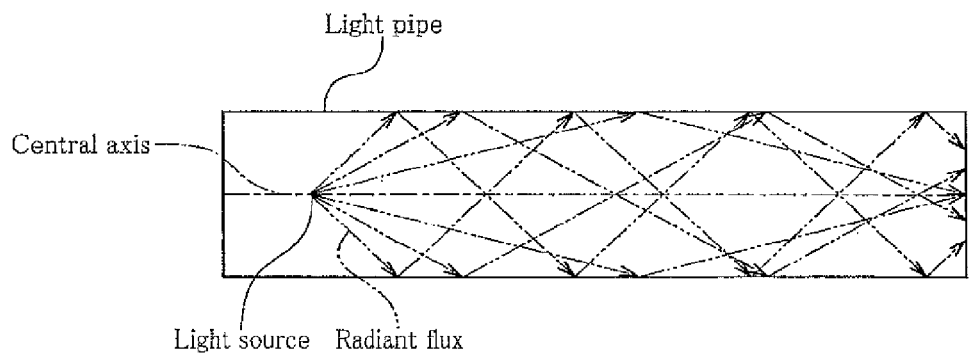
FIG. 11 is a schematic view for explaining the operating principle of a light pipe (in the case of a cylinder)

FIG. 11 is a schematic view for explaining the operating principle of the light pipe (in the case of a cylinder).

In FIG. 11, a cylindrical light pipe is an example of the shape of a light pipe that cannot enable the operation principle to be preferably realized. This light pipe is rotationally symmetrical relative to the central axis. The luminous fluxes having the same incident angle emitted from the light source are reflected by the light pipe, and then are concentrated at the same location of the central axis. For all incident angles, similar phenomenon occur. Therefore, the ratio of presence of the luminous flux on the central axis is increased, and the radiance distribution becomes highest on the central axis. Accordingly, the luminous flux cannot be irradiated in the uniformed state.

Figure 12:
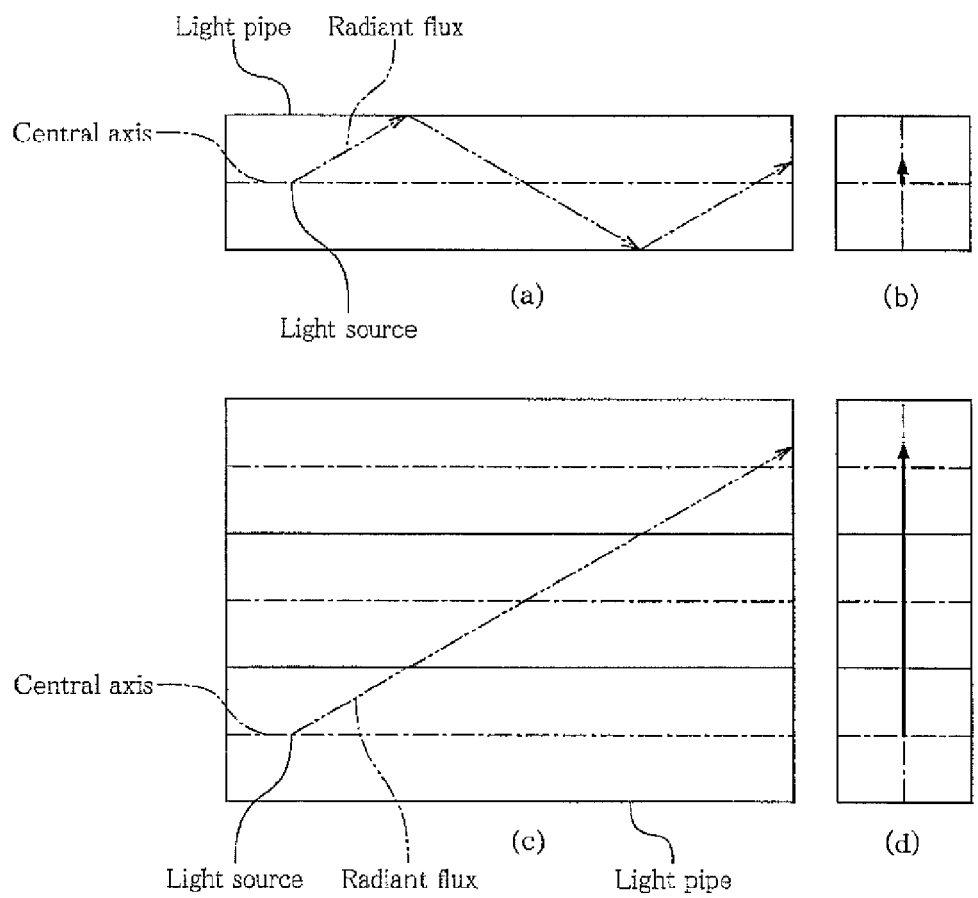
FIG. 12 is a schematic view for explaining the operating principle of a light pipe (in the case of a quadrangular prism)

FIG. 12 is a schematic view for explaining the operating principle of the light pipe (in the case of a quadrangular prism).

In FIG. 12, a pipe having a shape of a quadrangular prism is an example of a shape which enables the operation principle to be preferably realized. As shown in the front view of FIG. 12(*a*) and in the side view of FIG. 12(*b*), light fluxes emitted from the light source inside the light box are reflected twice, for example, to reach the exit. This light flux can be expressed by the development views of FIGS. 12(*c*) and (*d*). That is, it can be thought that, light fluxes which arrive at the upper most side surface shown in FIG. 12(*d*) are folded in the lower most side surface (edge surface) by the reflection. The same can be applied to all light fluxes having all incident angles which are emitted from the light source. As a result, the radiance distribution is uniformed in the lowermost side surface (edge surface).

Figure 13:
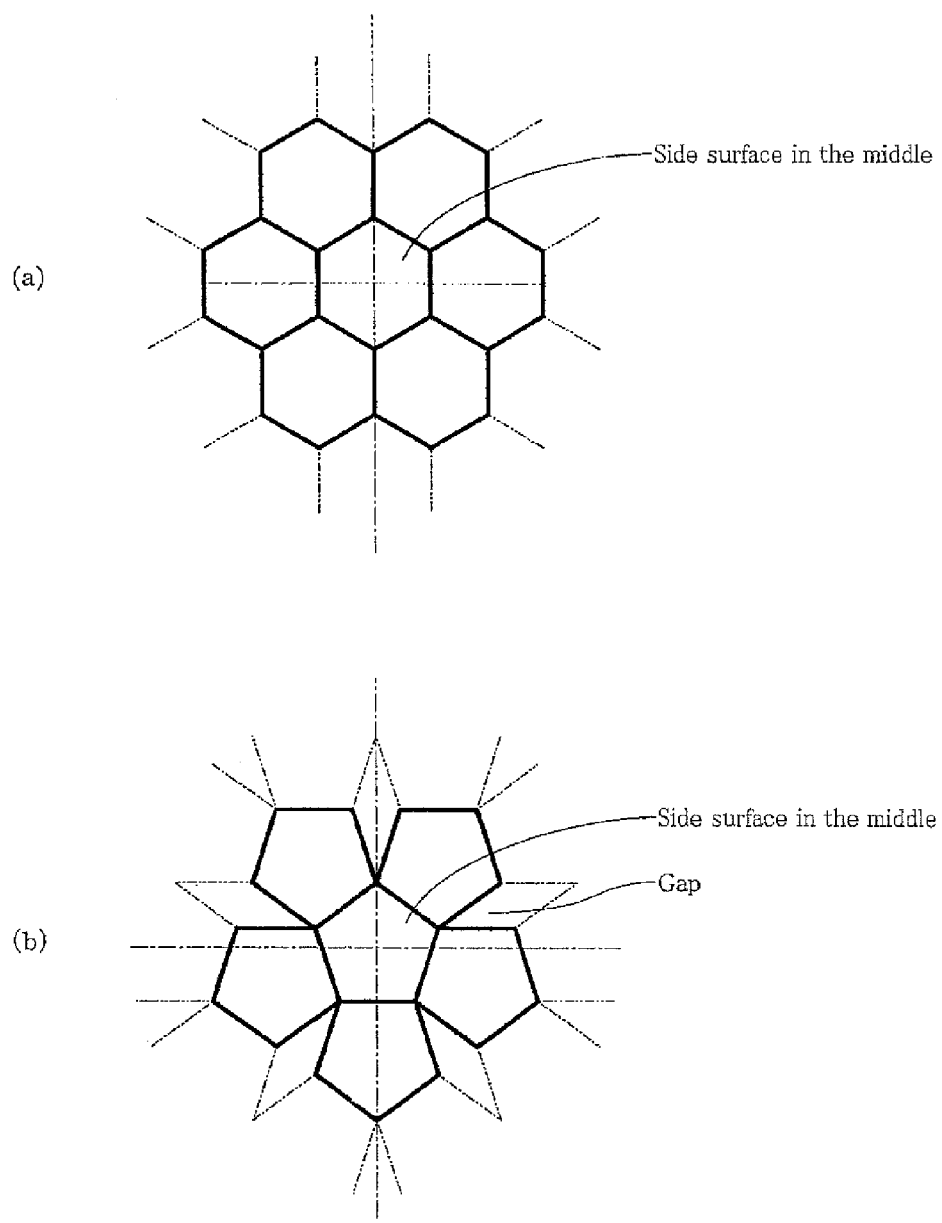
FIG. 13 is a schematic view for explaining the operating principle of a light pipe (in the case of a regular hexagonal prism and a regular pentagonal prism)

FIG. 13 is a schematic view for explaining the operating principle of the light pipe (in the case of a regular hexagonal prism or a regular pentagonal prism).

In the side surface (edge surface) which has been developed as shown in FIG. 13(*a*), the light pipe having a regular hexagonal prism is an example of the shape which enables the operation principle to be realized preferable. As in the case of the light pipe having a quadrangular prism shown in FIG. 12, all of light fluxes emitted from the light source are folded in the side surface (edge surface) in the middle by the reflection. That is, in the side surface (edge surface) of the light pipe having a regular hexagonal prism, uniformed radiance distribution is attained.

In the developed side surface (edge surface) shown in FIG. 13(b), a regular pentagonal prism light pipe is an example of the shape of a light pipe that cannot enable the operation principle to be preferably realized. In this light pipe, a gap is formed in the developed side surface (edge surface). Therefore, when all light fluxes emitted from the light source are folded in the side surface (edge surface) by the reflection, coarseness generates in a size corresponding to the gap. That is, in the side surface (edge surface) of the light pipe having a regular pentagonal prism shape, coarseness is generated in an amount corresponding to the size of the gap, and radiation distribution becomes un-uniform.

From the above explanation, in the developed side surface (edge surface), as the cross sectional shape of the light pipe which does not lead to generation of a gap, a triangle (including an equilateral triangle), a tetragon (including a square, a rectangular oblong, a parallelogram), congruent pentagons formed when dividing a parallelohexagon by a straight line passing the center, a regular hexagon and a parallelohexagon can be given. These light pipes can realize a radiation distribution which can be uniformed at a significantly high level.

Meanwhile, light pipes having a cross sectional shape of a triangle, a square, a regular hexagon and a parallelohexagon can be produced readily due to the simple structure, whereby the production cost can be reduced.

Due to the square cross-sectional shape, as mentioned above, the light pipe 1002 can realize a highly uniformed radiation distribution.

The cross-sectional shape of the light pipe 1002 is square. The cross-sectional shape of the light pipe is, however, not limited thereto. For example, it may be a polygonal shape. Due to such a cross-sectional shape of the light pipe 1002, as compared with the light pipe having a circular cross-section, a disadvantage that infrared rays are concentrated in the middle of the irradiation port 1022 (or in the vicinity of the middle) can be eliminated, and as a result, infrared rays in the uniformed state can radiate from the irradiation port 1022.

Further, the cross sections of the light pipe 1002 and the light box 1003 may preferably be a shape which enables the operation principle of the light pipe to be preferably realized. Due to such a shape of the cross section, radiance distribution which has been uniformed at a significantly high level can be realized.

Here, as mentioned later, it is preferred that infrared rays radiated from the irradiation port 1022 of the light pipe 1002 heat the stamper 1052. Due to such a configuration, by infrared rays having a radiation distribution which has been uniformed at a significantly high level, every corner of the stamper 1052 having a large area can be uniformly radiation heated. Therefore, even in the case where the large-area stamper 1052 has a shape-forming surface 1521 having a fine pattern, the fine pattern can be transferred with a high degree of accuracy to the transfer surface 1061 that also has a large area.

As mentioned later, it is preferred that the heating apparatus 1001 have a shutter 1023 which shields infrared rays emitted from the irradiation port 1022 of the light pipe 1002. Due to such a configuration, by the on-off operation of the shutter 1023, the irradiation time can be controlled, whereby the temperature control of the surface to be irradiated can be conducted readily.

Subsequently, an explanation will be made on the method for heating and the like by using the heating apparatus 1001 having the above-mentioned configuration.

This method is a method in which the heating apparatus 1001 is used. The light source 1004 to be accommodated within the light box 1003 emits light (including infrared rays), and the emitted light passes the light pipe 1002 which is connected with the light box 1003, is radiated from the irradiation port 1022 of the light pipe 1002, and the light radiated from the irradiation port 1022 heats the surface to be irradiated.

As mentioned above, the cross-sectional shapes of the light pipe 1002 and the light box 1003 are not limited to a square, and they may be a polygonal shape, for example.

In the heating apparatus 1001, the light source 1004 accommodated within the light box 1003 radiates infrared rays.

Here, infrared rays radiated from the light source 1004 pass through the opening part 1032 and enter the light pipe 1002 with its part being not reflected by the mirror surface of the light box 1003. Other infrared rays pass through the opening part 1032 after once or twice or more of reflection by the mirror surface, and then enter the light pipe 1002. The infrared rays are reflected by the mirror surface which is a rectangular parallelopipe (mirror surface corresponding to the internal space 1031), pass through the opening part 1032 in the uniformed state (called "premixed state"), and enter the light pipe 1002. As a result, the heating apparatus 1001 enables the opening part 1032 to be irradiated with the infrared rays in the uniformed state (called "premixed state").

Due to the square cross-sectional shape of the light box 1003, in the heating apparatus 1001, infrared rays in the highly uniformed state can be radiated to the opening part 1032.

The infrared rays radiated to the opening port 1032 pass through the light pipe 1002 which is connected to the light box 1003, and is radiated from the irradiation port 1022 of the light pipe 1002. At this time, infrared rays entered from the opening part 1032 are radiated from the irradiation port 1022 with its part being not reflected by the mirror surface of the light pipe 1002. Other infrared rays pass through the irradiation port 1022 after once or twice or more of reflection by the mirror surface. By the reflection by the mirror surface which is a rectangular parallelopipe (mirror surface corresponding to the internal space 1021), the infrared rays are radiated from the irradiation port 1022 in the uniformed state (called "more premixed state").

Due to the square cross-sectional shape of the light pipe 1002, the heating apparatus 1001 enables the infrared rays which have been uniformed at a significantly high level to be radiated from the irradiation port 1022.

Further, in the heating apparatus 1001, since the light pipe 1002 and the light box 1003 have shapes that enable the operation principal to be preferably realized, infrared rays which have been uniformed at a further high level can be radiated from the irradiation port 1022. Further, due to the presence of the light box 1003, the infrared rays have been premixed. Therefore, even if the length ($L_2$) of the light pipe 1002 is shorten, it is possible to radiate the infrared rays which have been uniformed at a high level can be radiated from the irradiation port 1022, whereby the size of the heating apparatus 1001 can be reduced. Further, power loss is caused in the infrared rays by the reflection by the mirror surface. However, by shortening the length ($L_2$) of the light pipe 1002, power loss can be reduced.

The infrared rays irradiated from the irradiation port 1022 can heat the surface to be irradiated (not shown) uniformly at a high level. That is, the heating apparatus 1001 can radiation heat the stamper 1052 having a large area uniformly with the infrared rays which have been uniformed at a significantly high level. Therefore, even when the stamper 1052 has a shape-forming surface 1521 having a fine pattern, the pattern can be transferred to the transfer surface having a large area at a uniform transfer ratio.

As explained above, according to the heating apparatus 1001 and the heating method, light form the light source 1004 can be radiated uniformly to the surface to be irradiated, whereby the surface to be irradiated can be uniformly heated. Further, due to the simple structure of the light pipe 1002 and the light box 1003, the heating apparatus 1001 can be produced easily, whereby the production cost can be reduced.

The cross-sectional shapes of the light pipe 1002 and the light box 1003 are square. The cross-sectional shapes thereof are not limited thereto, and they may be different polygonal shapes. For example, the cross-sectional shape of the light pipe 1002 may be a regular hexagon and the cross-sectional shape of the light box 1003 may be an equilateral triangle. Due to such a configuration, the cross-sectional shape of the light box 1003 can be set according to the shape or the like of the light source 1004, and the cross-sectional shape of the light pipe 1002 can be set according to the shape or the like of the surface to be irradiated, whereby freedom in design and the like can be improved.

As shown in FIG. 10(*b*), the size of the cross section of the light box 1003 and the size of the cross section of the light pipe 1002 differ. Specifically, the cross section of the light box 1003 is larger in size than that of the light pipe 1002 (that is, if the cross section of the Light pipe 1002 is rotated around the center, the cross section of the light pipe 1002 is accommodated within the cross section of the light box 1003). By doing this, by increasing the number of the halogen lamps, the energy density of light radiated from the irradiation port 1022 can be enhanced, whereby the freedom in design and the like can be improved. The size of each cross section is not limited to that mentioned above.

Next, an application example relating to the size of the cross sections of the light box 1003 and the light pipe 1002 will be explained with reference to the drawings.

<First Application Example of the Heating Apparatus>

Figure 14:
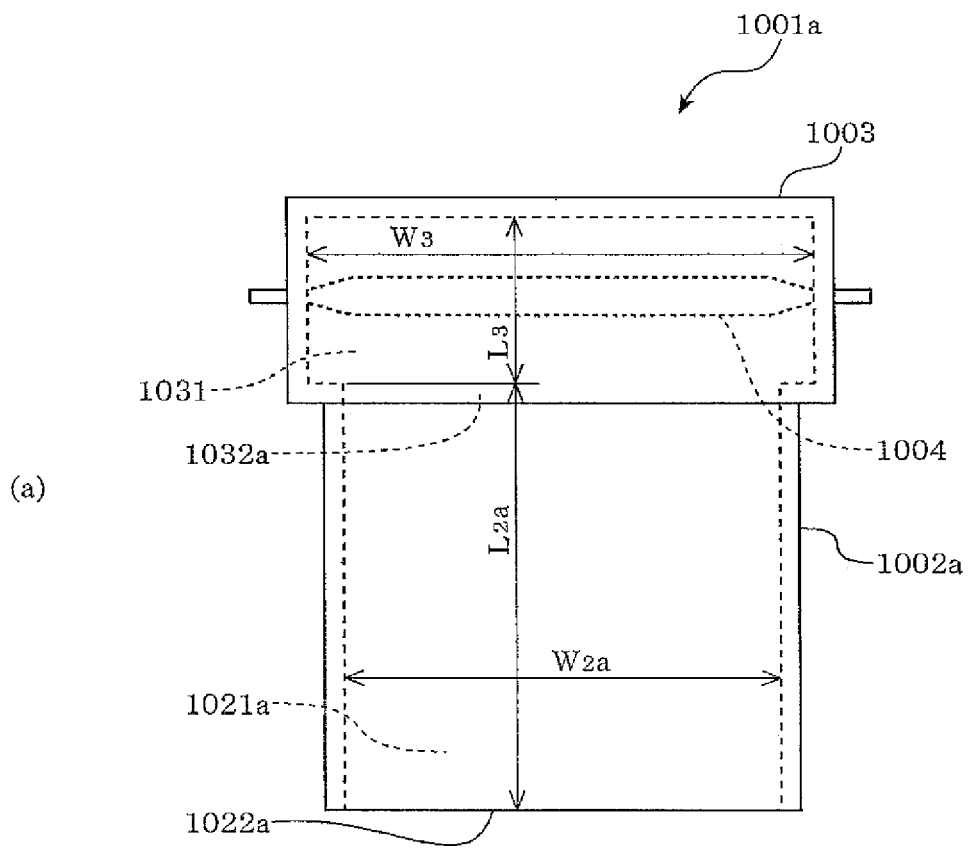
FIG. 14 is schematic view for explaining a heating apparatus according to a first application example, in which (a) is a front view and (b) is a bottom view.
Figure 14:
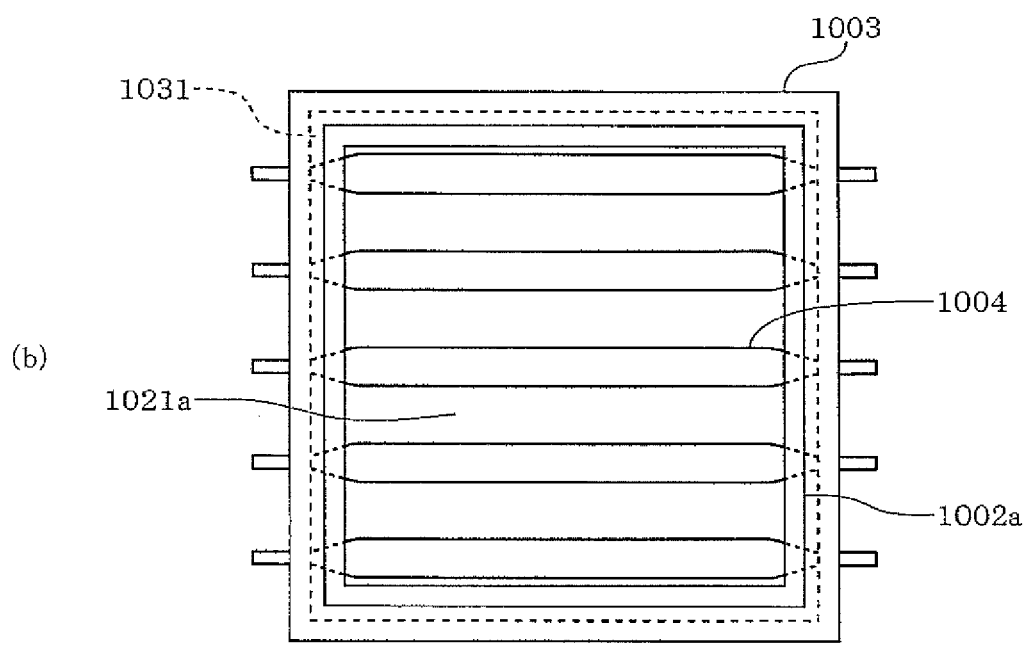

FIG. 14 is schematic view for explaining the heating apparatus according to the first application example, in which (a) is a front view and (b) is a bottom view.

In FIG. 14, a heating apparatus 1001*a* of the first embodiment differs from the heating apparatus 1001 mentioned above in that it has a light pipe 1002*a* instead of the light pipe 1002, and the like. Other configurations of this application example are almost similar to those of the heating apparatus 1001.

Therefore, in FIG. 14, constituting elements which are similar to those in FIG. 10 are indicated by the same referential numerals, and a detailed explanation is omitted.

The light pipe 1002*a* is a cylindrical shape having a square cross section (a cylindrical shape with the both ends being open), and is formed of a plate-like member having a mirror surface on its inside (for example, a steel plate in which silver plating or the like is provided on the surface serving as the inner surface).

This light pipe 1002*a* has an appropriately rectangular parallelopiped internal space 1021*a*. The internal space 1021*a* has a square bottom surface (the length of one side is $W_{2a}$) and a height of $L_{2a}$. The light pipe 1002*a* is connected with the light box 1003 such that one end part (an upper end part in FIG. 14(*a*)) corresponds to the opening part 1032*a*.

The relationship $W_3$ and $W_{2a}$ is $W_3 \approx W_{2a}$ (that is, the size of the cross section of the light box 1003 and the size of the cross section of the light pipe 1002*a* are almost the same). While satisfying the relationship, the above-mentioned dimensions $W_{2a}$ and $L_{2a}$ may appropriately be set.

In the heating apparatus 1001*a*, the light source 1004 accommodated within the light box 1003 radiates infrared rays. In this heating apparatus 1001*a*, as mentioned above, the cross-sectional shape of the light box 1003 is square, whereby infrared rays which have been uniformed at a significantly high level (called the "further mixed state") can be radiated to the opening part 1032*a*. The opening part 1032*a* has a square cross-sectional shape having a length of one side of $W_{2a}$.

The infrared rays radiated to the opening port 1032*a* pass through the light pipe 1002*a* which is connected to the light box 1003, and is radiated from the irradiation port 1022*a* of the light pipe 1002*a*. At this time, infrared rays entered from the opening part 1032*a* are radiated from the irradiation port 1022*a* with its part being not reflected by the mirror surface of the light pipe 1002*a*. Other infrared rays pass through the irradiation port 1022*a* after once or twice or more of reflection by the mirror surface. By the reflection by the mirror surface which is a rectangular parallelopipe (mirror surface corresponding to the internal space 1021*a*), the infrared rays are radiated from the irradiation port 1022*a* in the uniformed state (called "premixed state").

Due to the square cross-sectional shape of the light pipe 1002, the heating apparatus 1001*a* enables the infrared rays which have been uniformed at a significantly high level to be radiated from the irradiation port 1022*a*.

As explained above, according the heating apparatus 1001*a* of this embodiment, almost similar effects as those attained by the heating apparatus 1001 can be attained, and light emitted from the light source 1004 can be radiated to the surface to be irradiated uniformly, whereby the surface to be irradiated can be heated uniformly. Further, although not shown, the relationship $W_3$ and $W_{2a}$ may be $W_3 = W_{2a}$ (that is, the size of the cross section of the light box 1003 and the size of the cross section of the light pipe 1002*a* are the same). Further, due to the simple structure of the light pipe 1002*a* and the light box 1003, the heating apparatus 1001*a* can be produced easily, whereby the production cost can be reduced.

<Second Application Example of the Heating Apparatus>

Figure 15:
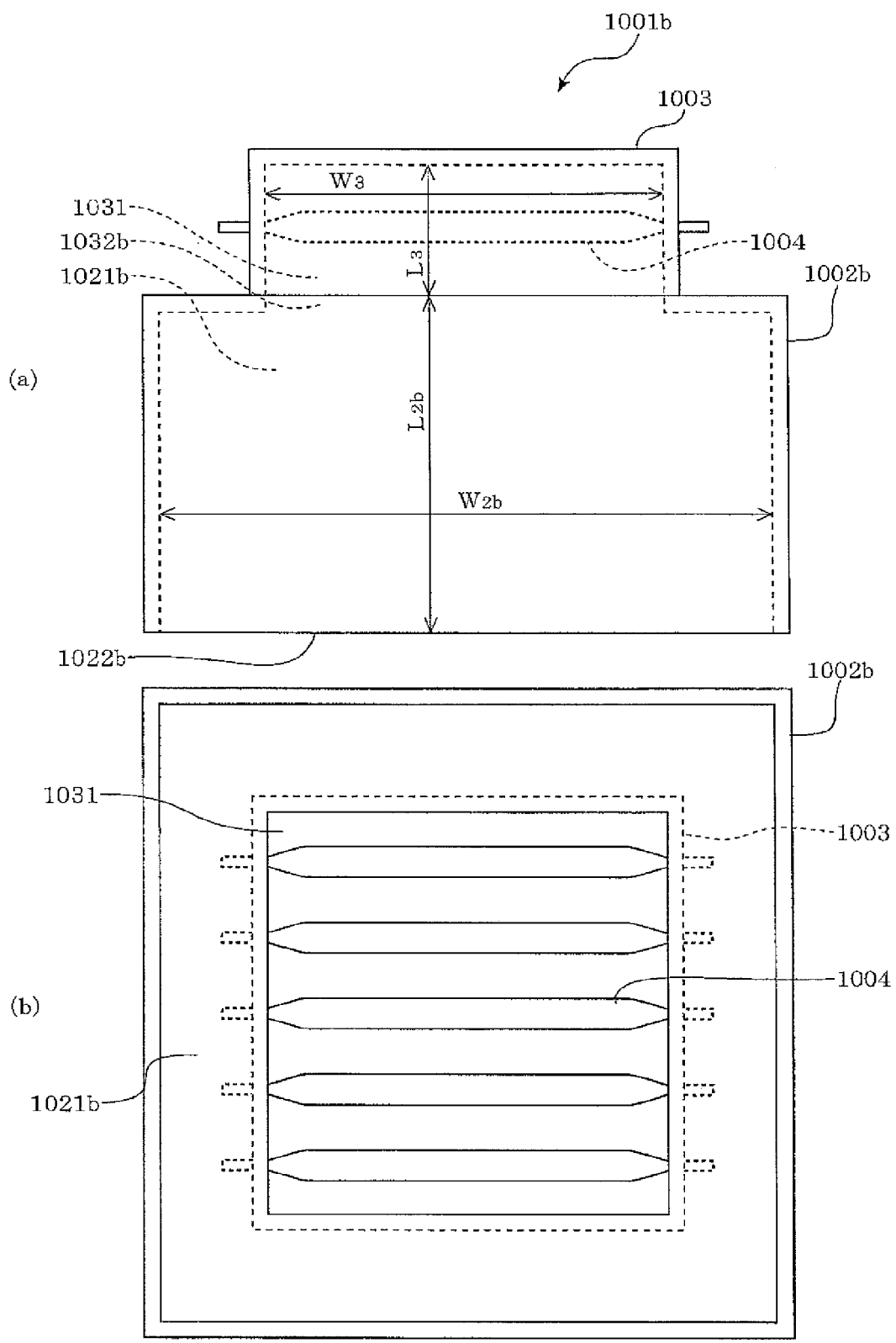
FIG. 15 is a schematic view for explaining a heating apparatus according to a second application example, in which (a) is a front view and (b) is a bottom view.

FIG. 15 is a schematic view for explaining the heating apparatus according to the second application example, in which (a) is a front view and (b) is a bottom view.

In FIG. 15, a heating apparatus 1001*b* of the second application example differs from the heating apparatus 1001 mentioned above in that it has a light pipe 1002*b* instead of the light pipe 1002, and the like. Other configurations of this application example are almost similar to those of the heating apparatus 1001.

Therefore, in FIG. 15 constituting elements which are similar to those in FIG. 10 are indicated by the same referential numerals, and a detailed explanation is omitted.

The light pipe 1002*b* is a cylindrical shape having a square cross section (a cylindrical shape with the both ends being open), and is formed of a plate-like member having a mirror surface on its inside (for example, a steel plate in which silver plating or the like is provided on the surface serving as the inner surface).

This light pipe 1002*b* has an appropriately rectangular parallelopiped inner space 1021*b*. The internal space 1021*b* has a square bottom surface (the length of one side is $W_{2b}$) and a height of $L_{2b}$. The light pipe 1002b is connected with the light box 1003 such that one end part (an upper end part in FIG. 15(a)) corresponds to the opening part 1032b (the length of one side is $W_3$).

The relationship $W_3$ and $W_{2b}$ is $W_3 < W_{2b}$ (that is, the size of the cross section of the light pipe 1002b is larger than the size of the cross section of the light pipe 1003). While satisfying the relationship, the above-mentioned dimensions $W_{2b}$ and $L_{2b}$ may appropriately be set.

In the heating apparatus 1001b, the light source 1004 accommodated within the light box 1003 radiates infrared rays. In this heating apparatus 1001b, as mentioned above, the cross sectional shape of the light box 1003 is square, infrared rays which have been uniformed at a significantly high level (called the "premixed state") can be radiated to the opening part 1032b.

The infrared rays radiated to the opening port 1032b pass through the light pipe 1002b which is connected to the light box 1003, and is radiated from the irradiation port 1022b of the light pipe 1002b. At this time, infrared rays entered from the opening part 1032b are radiated from the irradiation port 1022b with its part being not reflected by the mirror surface of the light pipe 1002b. Other infrared rays pass through the irradiation part 1022b after once or twice or more of reflection by the mirror surface. By the reflection by the mirror surface which is a rectangular parallelopipe (mirror surface corresponding to the internal space 1021b), the infrared rays are radiated from the irradiation part 1022b in the uniformed state (called "further mixed state").

Due to the square cross-sectional shape of the light pipe 1002b, the heating apparatus 1001b enables the infrared rays which have been uniformed at a significantly high level to be radiated from the irradiation port 1022b.

As explained above, according the molding apparatus 1001b according to this embodiment, almost similar effects as those attained by the molding apparatus 1001 of the first embodiment can be attained, and light emitted from the light source 1004 can be radiated to the surface to be irradiated uniformly, whereby the surface to be irradiated can be heated uniformly.

As shown in FIG. 15(b), the size of the cross section of the light box 1003 and the size of the cross section of the light pipe 1002b differ. Specifically, the cross section of the light pipe 1003 is smaller in size than that of the light pipe 1002 (that is, if the cross section of the light box is rotated around the center, the cross section of the light box 1003 is accommodated within the cross section of the light pipe 1002b). By doing this, even if the area of the surface to be irradiated is large (for example, if it is larger than the light source 1004), it can be applied readily, whereby the freedom in design and the like can be improved.

[Molding Apparatus and Method for Molding a Plastic Molded Product]

It is effective to use the above-mentioned heating apparatus 1001 or the like in the molding apparatus and the method for molding a plastic molded product.

Figure 16:
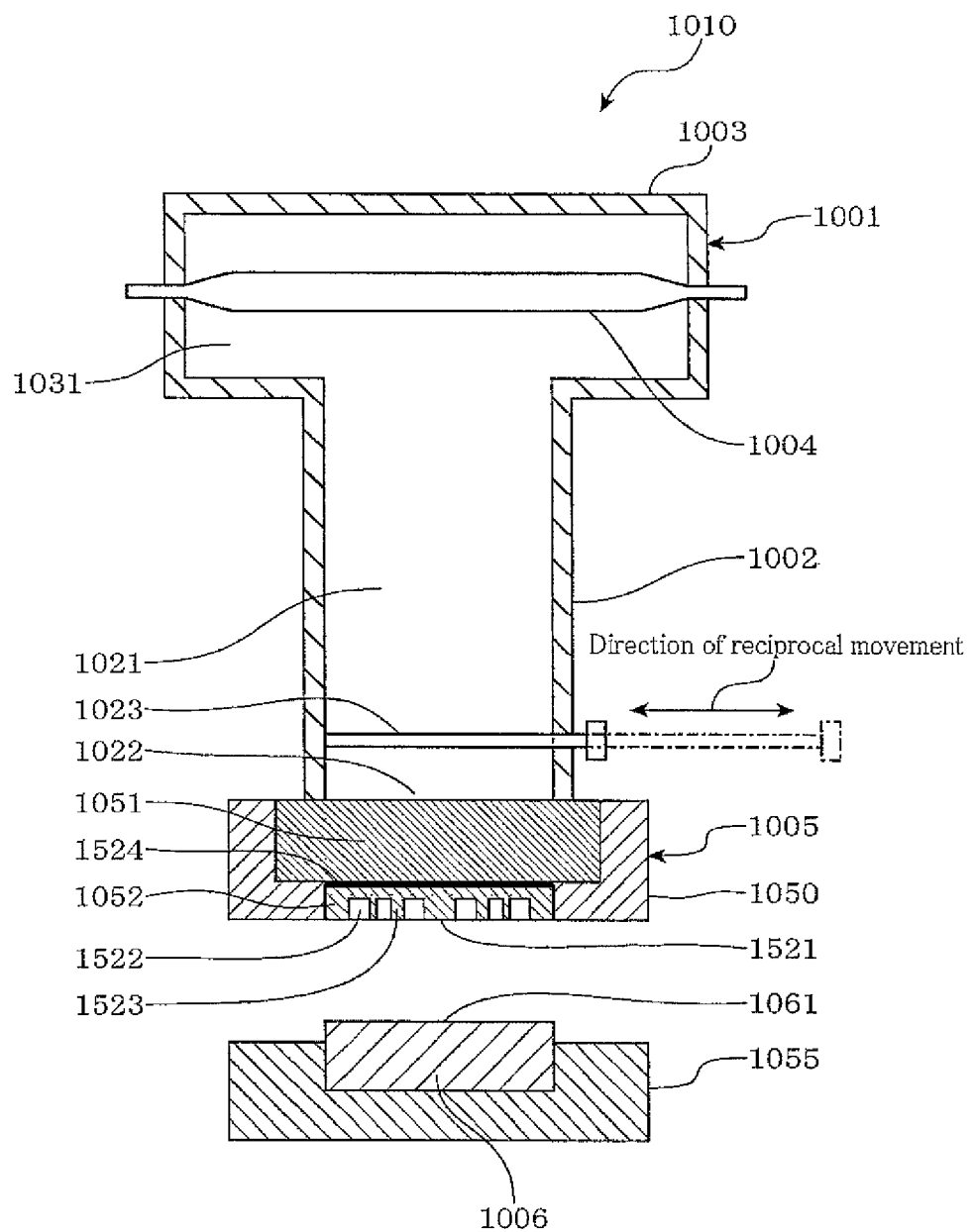
FIG. 16 is a schematic cross-sectional view for explaining essential parts for explaining a molding apparatus using the heating apparatus.

FIG. 16 is a schematic cross-sectional view for explaining the essential parts for explaining the molding apparatus using the heating apparatus.

In FIG. 16, the molding apparatus 1010 is provided with the above-mentioned heating apparatus 1001, a mold 1005 having an infrared rays-transmitting member 1051 which transmits infrared rays radiated from this heating apparatus 1001 and a stamper 1052 which is radiation heated by the infrared rays that penetrate the infrared rays-transmitting member 1051, and a pressing means (not shown) which press the shape-forming surface 1521 of the stamper 1052 to the transfer surface 1061 of the solidified plastic substrate 1006.

Normally, the material of the plastic substrate 1006 is a crystalline resin such as polyethylene terephthalate. The material of the plastic substrate is not limited thereto, and for example, an amorphous resin may be used. If an amorphous resin is used, a solidification step mentioned later is called a curing step.

(Heating Apparatus)

The heating apparatus 1001 shown in FIG. 16 differs from the above-mentioned heating apparatus in that it is provided with a shutter 1023, and the like. Other configurations are almost similar to those of the heating apparatus 1001 shown in FIG. 10.

Therefore, in FIG. 16 constituting elements which are similar to those in FIG. 10 are indicated by the same referential numerals, and a detailed explanation is omitted.

The shutter 1023 is formed of an approximate rectangular plate-like member having a mirror surface on its upper surface (for example, a steel plate in which silver plating or the like is provided on the upper surface). It reciprocally moves a distance of $W_2$+several mm+several tens mm, and the length in the direction crossing orthogonally the reciprocal movement is almost $W_2$. In this shutter 1023, the end part (end part on the right side in FIG. 16) positioned on the outside of the light pipe 1002 (the end part on the right side in FIG. 16) is connected to a reciprocal movement means (not shown). Further, the shutter 1023 is provided normally in the lower side of the light pipe 1002. The position of the shutter 1023 is not limited thereto. The shutter 1023 may be provided in the middle or the upper side of the light pipe 1002.

The shutter 1023 may have a configuration in which the side surface on the left side is a mirror surface, whereby, when the shutter 1023 moves to the right side, this mirror surface forms the same surface as the mirror surface of the light pipe 1002. Due to such a configuration, even though the shutter 1023 is provided, a disadvantage that adverse effects are exerted on the uniformization of irradiation can be eliminated.

The shutter 1023 is moved reciprocally. The movement of the shutter is, however, not limited to reciprocal movement. For example, although not shown, the shutter may be a rotating disc in which a plurality of openings are formed.

Further, although not shown, when the shutter 1023 is off (closed), in the internal space 1021 in the lower side of the shutter 1023, cool wind, for example, is circulated, whereby the infrared rays transmitting member 1051 is cooled. As a result, the stamper 1052 is quickly cooled, the productivity as the molding apparatus 1010 can be improved.

(Mold)

The mold 1005 is provided with an upper mold 1050 and a lower mold 1055. The upper mold 1050 and the lower mold 1055 are attached to a pressing means (for example, a low-pressure pressing machine (pressing pressure: 1.0 MPa)), which is not shown.

In the upper mold 1050, an approximately plate-like infrared rays-transmissive material 1051 is buried in the upper surface side, and an approximately plate-like stamper 1052 are buried in the lower surface side.

The infrared rays-transmissive material 1051 is formed of an infrared rays-transmissive material such as Si, $Al_2O_3$ (sapphire) and ZnSe, and transmit infrared rays radiated from the irradiation port 1022.

The stamper 1052 is normally formed of Ni and Si, and has a thickness of normally several hundreds μm. In this stamper 1052, a shape-forming surface 1521 is provided on the lower surface, and in the shape-forming surface 1521, a concave part 1522 and a convex part 1523 are formed. On the upper surface, a black film 1524 is formed, and infrared rays are absorbed by this film efficiently. As a result, the shape-forming surface 1521 of the stamper 1052 can be heated uniformly and quickly by the radiation heating of infrared rays. In this stamper 1052, the black film 1524 is formed. The embodiment is, however, not limited thereto. For example, the stamper 1052 may have a colored film and/or a plated film. For the formation of a colored film, use of a silicone-based black paint or the like can be given. For the formation of a plated film, electroless Ni plating, black Cr plating or the like can be given.

In the lower mold 1055, a concave part in a shape corresponding to the plastic substrate 1006 is formed. In this concave part, the plastic substrate 1006 is mounted in the positioned state.

No specific restrictions are imposed on the shape, the thickness, the quantity or the like of the infrared rays-transmitting member 1051 and the stamper 1052. For example, although not shown, in one upper mold 1050, a plurality of infrared-transmitting members 1051 and a plurality of stampers 1052 may be arranged.

Further, the infrared rays-transmitting member 1051 functions as a heat sink after switching irradiation of infrared rays off. That is, it absorbs the heat of the heated stamper 1052 and a part to be heated 1062 quickly, whereby the temperature of the part to be heated 1062 is lowered quickly to a temperature at which mold releasing is possible. As a result, molding cycle can be shortened.

Subsequently, the method for molding a plastic molded product using the heating apparatus 1001, the operation of the molding apparatus 1010 having the above configuration and the like will be explained with reference to the drawings.

Figure 17:
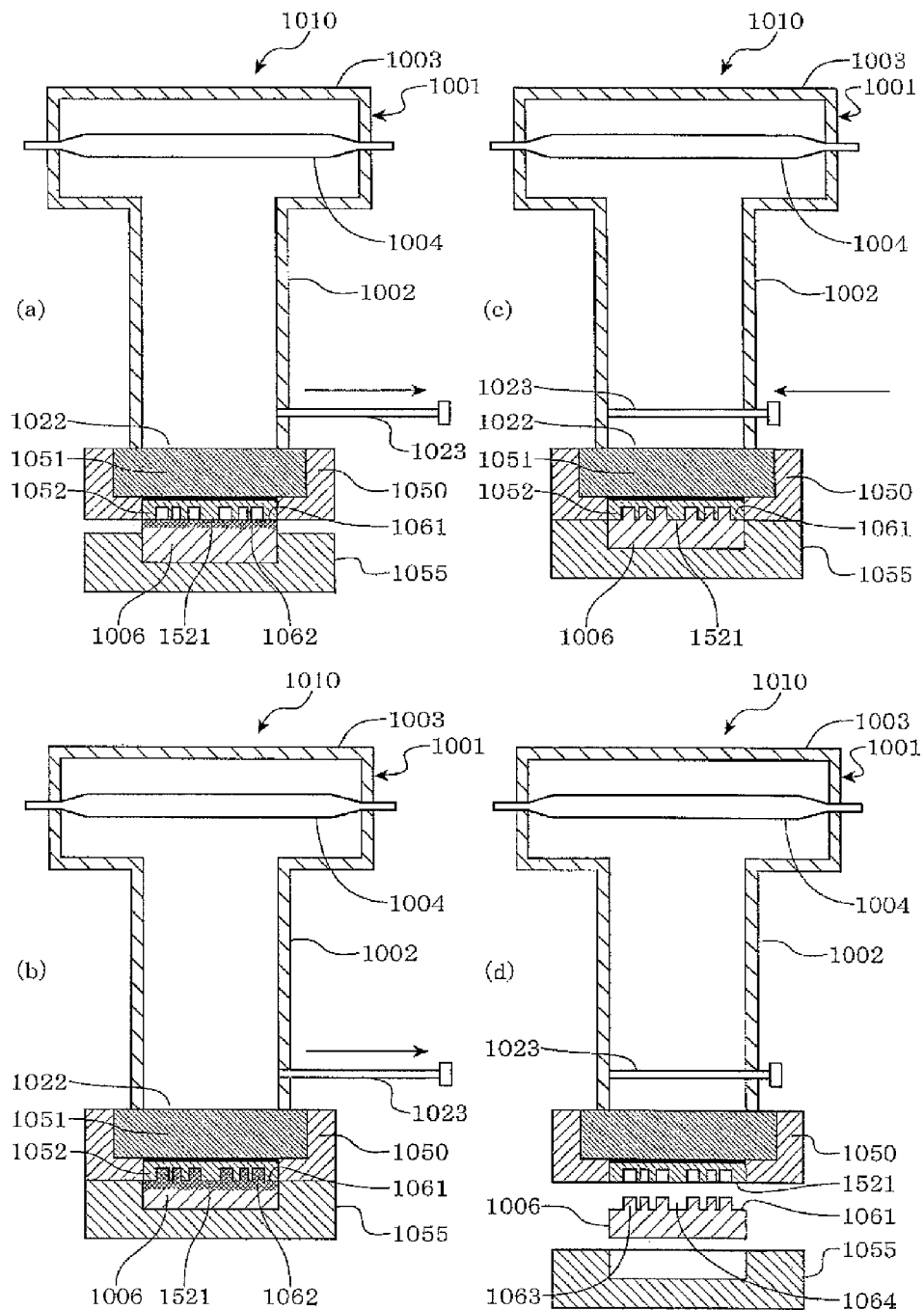
FIG. 17 is a schematic cross-sectional view for explaining the essential parts for explaining a method for molding a plastic molded product using the heating apparatus.

FIG. 17 is a schematic cross-sectional view for explaining the essential parts for explaining the method for molding a plastic molded product using the heating apparatus.

This method for molding a plastic molded product is a method using the molding apparatus 1010. This method has a step in which, for the solidified plastic substrate 1006, the stamper 1052 is radiation heated by the infrared rays irradiated from the heating apparatus 1001 in the state where the shape-forming surface 1521 of the stamper 1052 is pressed against the transfer surface 1061 of the plastic substrate 1006, thereby allowing the structure of the shape-forming surface 1521 to be transferred to the transfer surface 1061, a step in which the plastic substrate 1006 is solidified in the state where the shape-forming surface 1521 is pressed against the transfer surface 1061, and a step in which a plastic molded product (molded plastic substrate 1006) is released from the mold by releasing the pressed state.

As mentioned above, this method for molding a plastic molded product is a molding method in which embossing molding is conducted for the plastic substrate 1006 by using the heating apparatus 1001, the mold 1005 and the like and comprises a transfer step, a solidification step and a mold-releasing step.

The molding apparatus 1010 is in the stand-by state shown in FIG. 16. That is, in the molding apparatus 1010, the light source 1004 radiates infrared rays, and the shutter 1023 is off (closed). Further, the upper mold 1050 and the lower mold 1055 are separated by a pressing means, and the plastic substrate 1006 is mounted on the lower mold 1055.

(Transfer Step)

In the transfer step, for the solidified plastic substrate 1006, the stamper 1052 is radiation heated by the infrared rays irradiated from the heating apparatus 1001 in the state where the shape-forming surface 1521 of the stamper 1052 is pressed against the transfer surface 1061 of the plastic substrate 1006, thereby allowing the structure of the shape-forming surface 1521 to be transferred to the transfer surface 1061.

That is, as shown in FIG. 17(*a*), the upper mold 1050 and/or the lower mold 1055 are moved by means of a pressing means, and in the state where the shape-forming surface 1521 is pressed against the transfer surface 1061 of the plastic substrate 1006, infrared rays are radiated (the shutter 1023 is on (opened)), whereby the stamper 1052 is radiation heated. At this time, as mentioned above, in the heating apparatus 1001, infrared rays which are in the uniformed state are irradiated from the irradiation port 1022, the infrared rays transmit the infrared rays-transmitting member 1051, and while keeping the uniformed state, or in the further uniformed state, the infrared rays are delivered to the stamper 1052, whereby the stamper 1052 can be radiation heated uniformly.

Pressing and radiating of infrared rays are normally almost simultaneously conducted, or radiation of infrared rays is conducted prior to the pressing. The timing is, however, not limited thereto. The timing is adjusted according to the material of the plastic substrate 1006, the shapes of the concave part 1522 and the convex part 1523, the output power of infrared rays or the like.

Since infrared rays transmit the infrared rays transmitting member 1051, the infrared rays transmitting member 1051 is not almost heated. The steel-made upper mold 1050 is not heated since it is not irradiated with infrared rays.

When the stamper 1052 is heated, heat is conducted to the transfer surface 1061 of the plastic substrate 1006 which is in contact with the stamper 1052, whereby the transfer surface 1061 is uniformly heated. The "transfer surface is heated" means that the "transfer surface and a region which is deep from the transfer surface for a prescribed distance (normally a depth which is 1.5 times or more and 5 times or less of the distance between the highest convex part 1523 and the deepest concave part 1522 of the shape-forming surface 1521) is heated".

Accordingly, only the stamper 1052, the transfer surface 1061 and a region from the transfer surface 1061 to a position which is deep for a prescribed distance from the transfer surface 1061 (part to be heated 1062) are locally heated for a short period of time. If the region to be heated is restrictive, the thermal capacitance thereof is also small. If irradiation of infrared rays is stopped, heat is transferred to the infrared rays transmitting member 1051 having a high thermal conduction and the upper mold 1050 in this order, and the region to be heated is cooled for a short period of time. That is, the time required for heating and cooling can be shortened, whereby productivity can be improved. In addition, since locational insufficient heating or insufficient cooling does not occur, transfer can be conducted at a uniform transfer ratio over the entire region of the transfer surface having a large area.

Subsequently, as shown in FIG. 17(*b*), a resin of which the viscosity is lowered due to the melting of the part to be heated 1062 enters the concave part 1522 of the shape-forming surface 1521, transfer is conducted.

(Solidifying Step)

As shown in FIG. 17(*c*), in the state where the shape-forming surface 1521 is pressed against the transfer surface 1061, irradiation of infrared rays is stopped (the shutter 1023 is off (closed)), the plastic substrate 1006 (part to be heated 1062 which is molten) is solidified.

At this time, as mentioned above, only the stamper 1052, the transfer surface 1061 and a region from the transfer surface 1061 to a position which is deep for a prescribed distance from the transfer surface (part to be heated 1062) are locally heated (see FIG. 17(*b*)), and the upper mold 1050 and the infrared rays transmitting member 1051 are not almost heated. As a result, the part to be heated 1062 which has been molten is cooled for a short period of time, and solidified. That is, the cooling time can be shortened, whereby productivity can be improved.

(Mold-Releasing Step)

Then, as shown in FIG. 17(*d*), the upper mold 1050 and/or the lower mold 1055 are moved, whereby the state in which the shape-forming surface 1521 is pressed against the transfer surface 1061 is released. As a result, a plastic molded product (the plastic substrate 1006 in which a convex part 1063 and a concave part 1064 are formed by molding) is released from the mold.

As mentioned above, according to the molding apparatus 1010 and the method for molding a plastic molded product, by heating the stamper 1052 uniformly, the fine pattern on the shape-forming surface 1521 can be transferred to the entire surface to be irradiated having a large area at a uniform transfer ratio. Further, the time required for heating and cooling can be shortened, leading to improvement in productivity.

[Example of Light Box]

As an example of the light box of the above-mentioned heating apparatus 1001, radiation performance at the exit of the light box (surface at which irradiance is measured) was calculated (numerical analysis).

Figure 18:
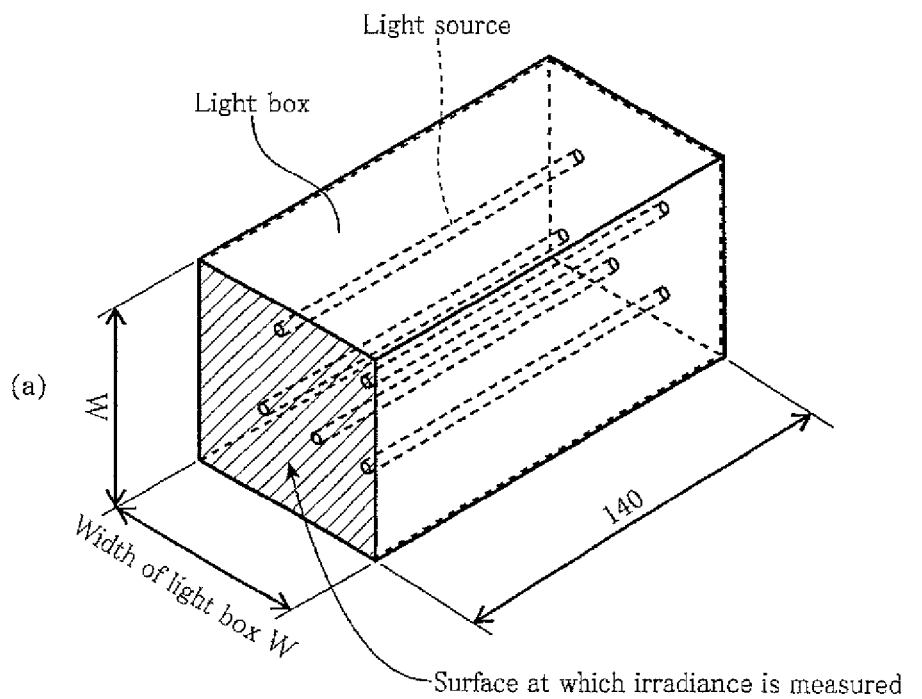
FIG. 18 is a schematic perspective view for explaining the example and the comparative example of the light box.
Figure 18:
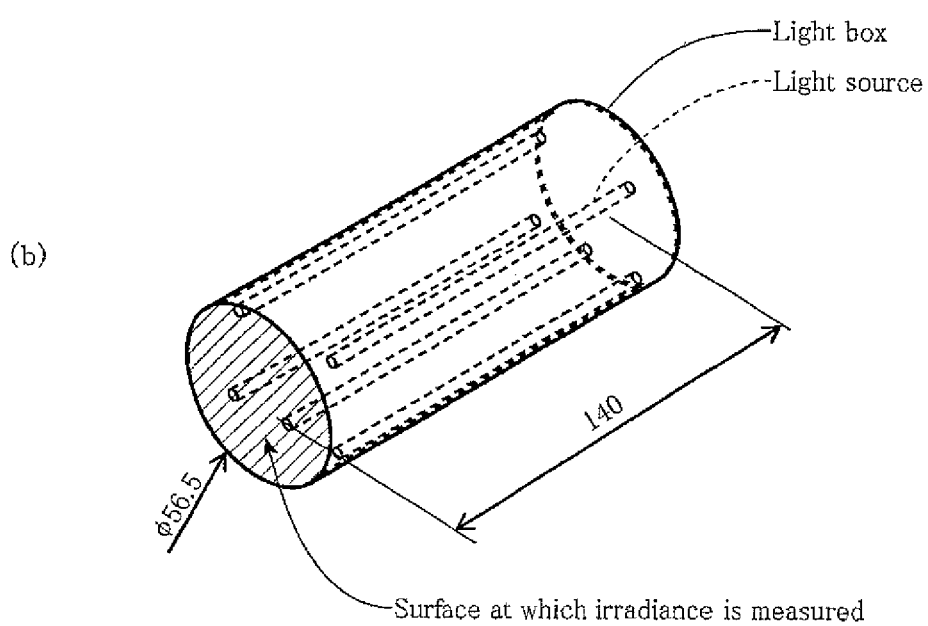

The light box had a structure shown in FIG. 18(*a*). That is, the light box was a rectangular parallelopiped having a square exit (surface at which irradiance is measured) (the length of one side (light box width) is W) and having a height of 140 mm. As the light source, five rod-like halogen heaters (output of one halogen heater was 1.5 kW) were arranged in parallel with the length direction. The total reflective index of the inner surface of the light box was 95%.

For the above-mentioned light box, by using an analysis software (product name: ZEMAX), the radiant flux (unit: W) relative to the width (W) of the light box (50 to 130 mm) was calculated. The radiant flux is a value output from the exit (surface at which irradiance is measured).

Figure 19:
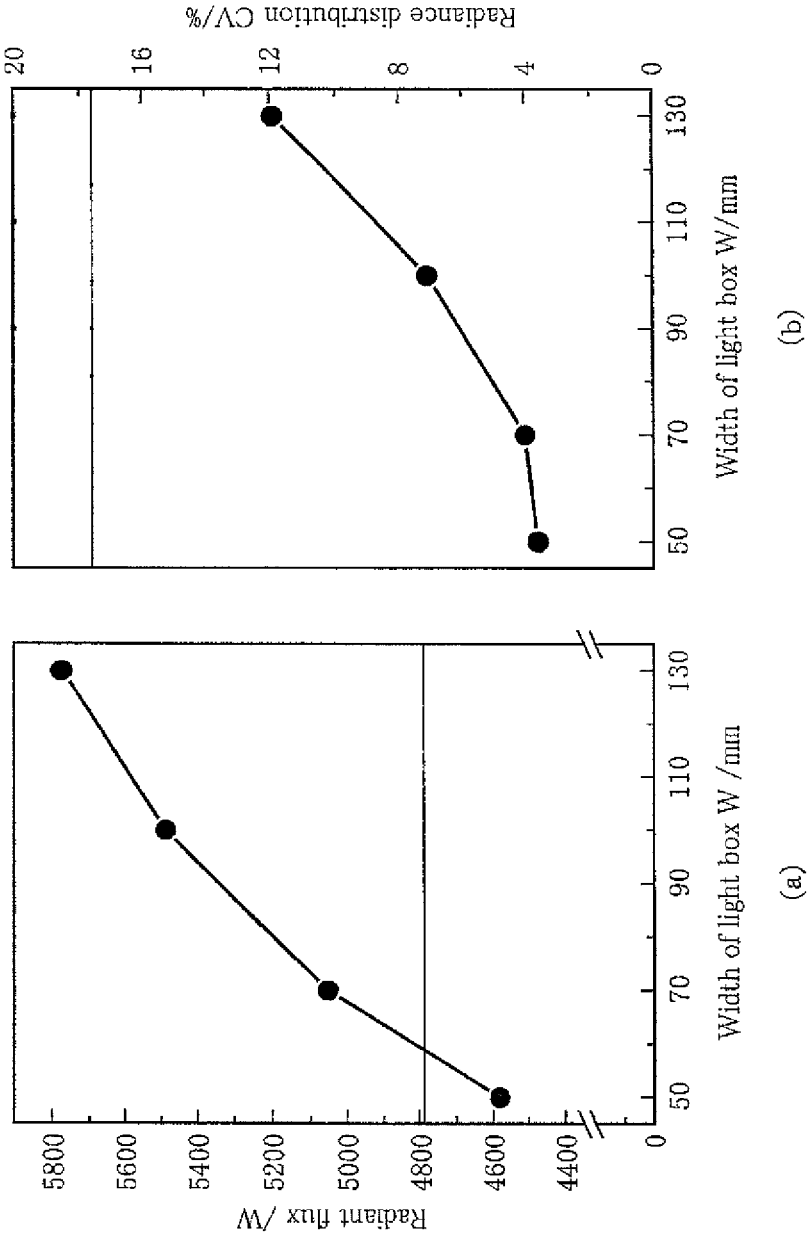
FIG. 19 is a graph for explaining the calculation results of radiation performance calculation of the example and the comparative example of the light box.

The results of calculation are, as shown in FIG. 19(*a*),
Radiant flux at W=50 mm: about 4580 W
Radiant flux at W=70 mm: about 5060 W
Radiant flux at W=100 mm: about 5490 W
Radiant flux at W=130 mm: about 5770 W For the above-mentioned light box, by using an analysis software (product name: ZEMAX), the radiance distribution relative to the width (W) of the light box (50 to 130 mm) was calculated. The radiance distribution was evaluated by CV (unit:%) was defined below. If the radiance distribution is small (i.e. variations are small) at the exit (surface at which irradiance is measured), CV has a small value. If the radiance distribution is large (i.e. variations are large), CV has a large value.

$$CV = \frac{\sigma}{\bar{x}} \times 100$$

CV: Coefficient of variation (%)
σ: Standard deviation of irradiance in the surface to be measured
x̄: Average value of irradiance in the surface to be measured
The results of calculation are, as shown in FIG. 19(*b*),
Radiance distribution CV at W=50 mm: about 3.6%
Radiance distribution CV at W=70 mm: about 3.9%
Radiance distribution CV at W=100 mm: about 7.0%
Radiance distribution CV at W=130 mm: about 11.8%

[Comparative Example of Light Box]

As a comparative example of the light box of the above-mentioned heating apparatus 1001, radiation performance at the exit of the light box (surface at which irradiance is measured) was calculated (numerical analysis).

The light box had a structure shown in FIG. 18(*b*). That is, the light box was a bottomed cylinder having a circular exit (surface at which irradiance is measured) (the diameter is 56.5 mm) and having a height of 140 mm. As the light source, five rod-like halogen heaters (output of one halogen heater was 1.5 kW) were arranged in parallel with the length direction. The total reflective index of the inner surface of the light box was 95%.

For the above-mentioned light box, by using an analysis software (product name: ZEMAX), the radiant flux (unit W) relative to the width (W) of the light box (50 to 130 mm) was calculated. The radiant flux is a value output from the exit (surface at which irradiance is measured).

For the above-mentioned light box, by using an analysis software (product name: ZEMAX), the radiant flux (unit: W) was calculated. The radiant flux is a value output from the exit (surface at which irradiance is measured).

As a result of the calculation, as shown in FIG. 19(*a*), the radiant flux was about 4790 W.

For the above-mentioned light box, by using an analysis software (product name: ZEMAX), the radiance distribution CV (unit: %) was calculated.

As a result of the calculation, as shown in FIG. 19(*b*), the radiance distribution CV was about 17.6%.

From the example and the comparative example of the light box, it was confirmed that, by allowing the cross-sectional shape of the light box to be square, light premixing effects became significant. That is, when W=70 mm or more as in the example, as compared with the comparative example, a larger radiant flux was obtained, and a significantly uniform radiance distribution was attained. Therefore, high power and uniform irradiation could be realized.

[Example of Heating Apparatus]

As one example of the above-mentioned heating apparatus 1001, radiation performance at the exit of the light pipe (surface at which irradiance is measured) was calculated (numerical analysis).

Figure 20:
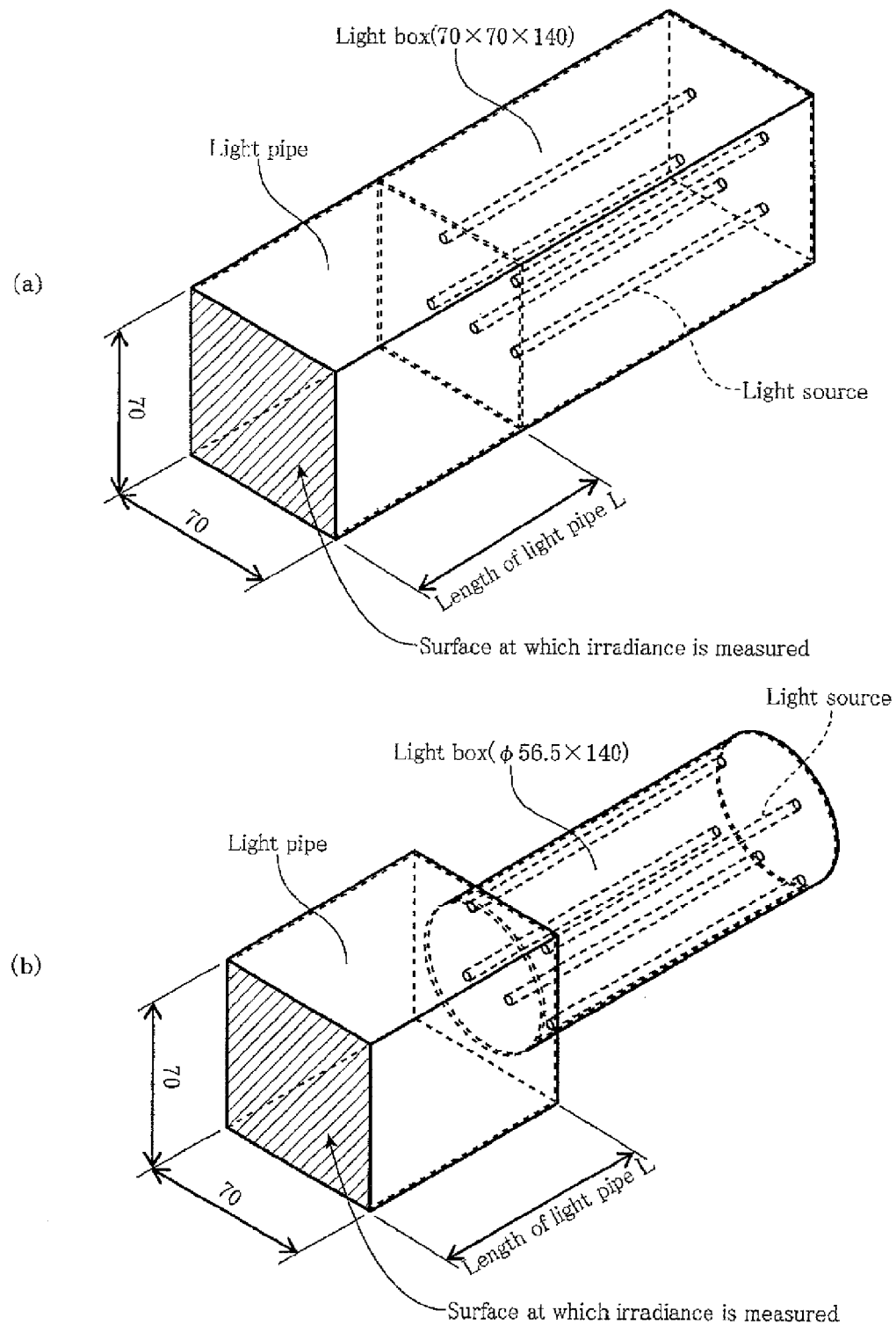
FIG. 20 is a schematic perspective view for explaining the example and the comparative example of the heating apparatus.

The heating apparatus had a structure shown in FIG. 20(*a*). That is, the light box was a rectangular parallelopiped having a square exit (surface at which irradiance is measured) (the length of one side (light box width) is 70 mm) and having a height of 140 mm. As the light source, five rod-like halogen heaters (output of one halogen heater was 1.5 kW) were arranged in parallel with the length direction. The total reflective index of the inner surface of the light box was 95%.

As for the light pipe to be connected with the light box, it was a rectangular parallelepiped having a square exit (surface at which the irradiance was measured) (the length of one side (light pipe width) is 70 mm) and having a length (light pipe length) of L mm. The total reflective index of the inner surface of the light pipe was 95%.

For the above-mentioned heating apparatus, by using an analysis software (product name: ZEMAX), the radiant flux (unit: W) relative to the length (L) of the light pipe (0 to 180 mm) was calculated. The radiant flux is a value output from the exit (surface at which irradiance is measured).

Figure 21:
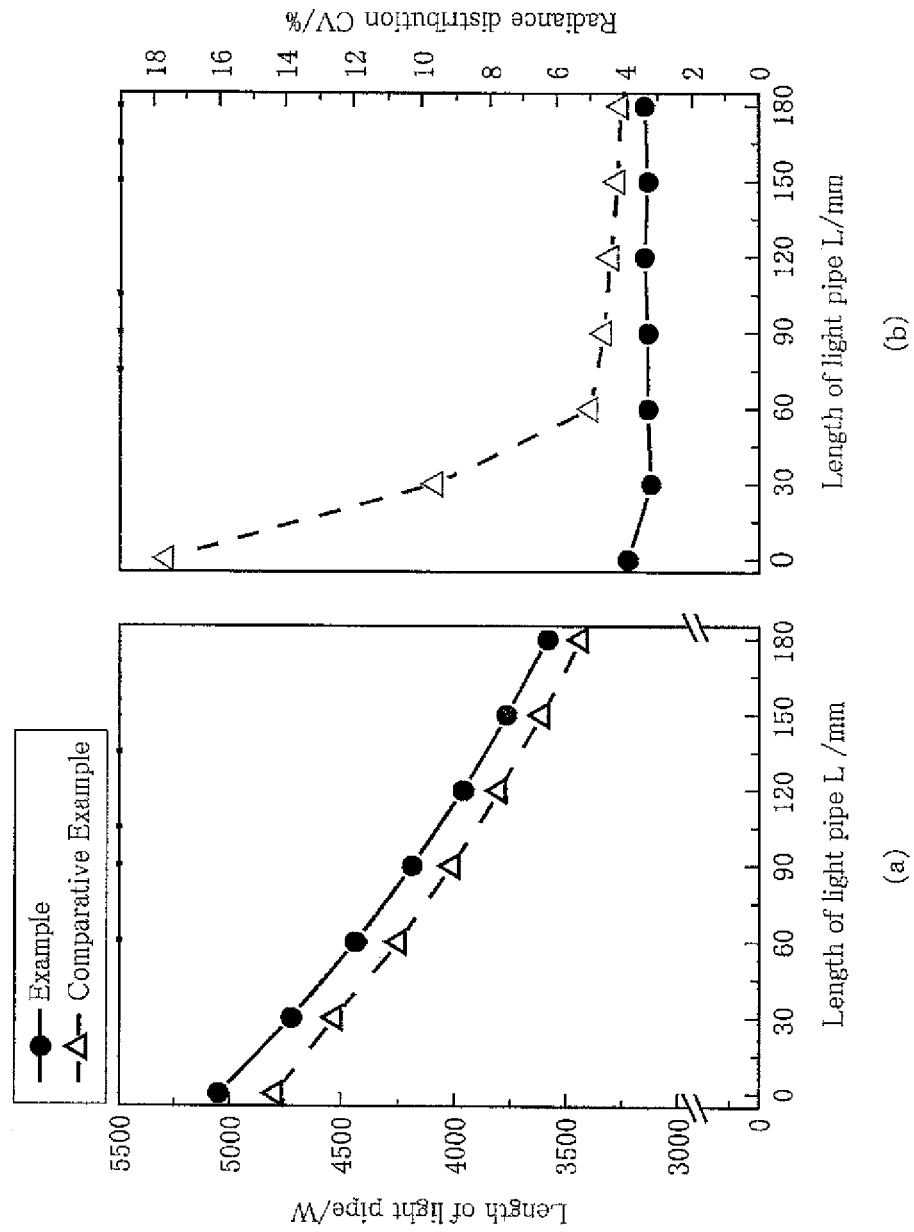
FIG. 21 is a graph for explaining the calculation results of radiation performance calculation of the example and the comparative example of the heating apparatus.

The results of calculation are, as shown in FIG. 21(*a*),
Radiant flux at L=0 mm: about 5050 W
Radiant flux at L=30 mm: about 4700 W
Radiant flux at L=60 mm: about 4430 W
Radiant flux at L=90 mm: about 4190 W
Radiant flux at L=120 mm: about 3970 W Radiant flux at L=150 mm: about 3770 W
Radiant flux at L=180 mm: about 3590 W For the above-mentioned heating apparatus, by using an analysis software (product name: ZEMAX), the radiance distribution CV (unit %) relative to the length (L) of the light pipe (0 to 180 mm) was calculated. If the radiance distribution CV is small, the irradiance at the exit (surface at which irradiance is measured) is uniform, and if the radiance distribution CV is large, the irradiance at the exit (surface at which irradiance is measured) is not uniform.

The results of calculation are, as shown in FIG. 21(b),
Radiance distribution CV at L=0 mm: about 4.0%
Radiance distribution CV at L=30 mm: about 3.2%
Radiance distribution CV at L=60 mm: about 3.3%
Radiance distribution CV at L=90 mm: about 3.3%
Radiance distribution CV at L=120 mm: about 3.4%
Radiance distribution CV at L=150 mm: about 3.3%
Radiance distribution CV at L=180 mm: about 3.4%

[Comparative Example of Heating Apparatus]

As a comparative example of the heating apparatus 1001, radiation performance at the exit of the light pipe (surface at which irradiance is measured) was calculated (numerical analysis).

The heating apparatus had a structure shown in FIG. 20(b). That is, the light box was a bottomed cylinder having a circular exit (the diameter was 56.5 mm) and having a height of 140 mm. As the light source, five rod-like halogen heaters (output of one halogen heater was 1.5 kW) were arranged in parallel with the length direction. The total reflective index of the inner surface of the light box was 95%.

As for the light pipe to be connected with the light box, it was a rectangular parallelepiped having a square exit (surface at which the irradiance was measured) (the length of one side (light box width) is 70 mm) and having a length (light pipe length) of L mm. The total reflective index of the inner surface of the light pipe was 95%.

For the above-mentioned heating apparatus, by using an analysis software (product name: ZEMAX), the radiant flux (unit: W) relative to the length (L) of the light pipe (0 to 180 mm) was calculated. The radiant flux is a value output from the exit (surface at which irradiance is measured).

The results of calculation are, as shown in FIG. 21(a),
Radiant flux at L=0 mm: about 4800 W
Radiant flux at L=30 mm: about 4520 W
Radiant flux at L=60 mm: about 4300 W
Radiant flux at L=90 mm: about 4020 W
Radiant flux at L=120 mm: about 3810 W
Radiant flux at L=150 mm: about 3610 W
Radiant flux at L=180 mm: about 3440 W For the above-mentioned heating apparatus, by using an analysis software (product name: ZEMAX), the radiance distribution CV (unit:%) relative to the length (L) of the light pipe (0 to 180 mm) was calculated.

The results of calculation are, as shown in FIG. 21(b),
Radiance distribution CV at L=0 mm: about 17.6%
Radiance distribution CV at L=30 mm: about 9.6%
Radiance distribution CV at L=60 mm: about 5.0%
Radiance distribution CV at L=90 mm: about 4.6%
Radiance distribution CV at L=120 mm: about 4.4%
Radiance distribution CV at L=150 mm: about 4.2%
Radiance distribution CV at L=180 mm: about 3.9%

From the above-mentioned example and comparative example of the heating apparatus, it was confirmed that the length L of the light pipe to attain a radiance distribution of CV≤4% was 30 mm in the example and 180 mm in the comparative example.

In the example, the radiant flux was about 4700 W at L=30 mm and, in the comparative example, the radiant flux was about 3440 W at L=180 mm.

That is, in the heating apparatus of this example, due to the provision of the light box having a square cross section, the length L of the light box required to attain a radiance distribution of CV≤4% was 30 mm. As compared with 180 mm in the comparative example, a reduction in size could be realized. On the other hand, in the case of the heating apparatus in the example, the radiant flux was about 4700 W at L=30 mm, and as compared with the comparative example (the radiant flux was about 3440 W at L=180 mm), power loss (power loss caused by uniform radiation of light) could be significantly reduced.

An explanation was made about the heating apparatus, the heating method, the molding apparatus and the method for molding a plastic molded product. However, the heating apparatus, the heating method, the molding apparatus and the method for molding a plastic molded product are not restricted to the explanation mentioned above and the like, and it is needless to say various modifications are possible.

For example, the molding apparatus 1010 had a configuration in which compression molding is conducted for the plastic substrate 1006. The plastic substrate 1006 may be a gas-impregnated plastic. In this way, in the mold-releasing step, the gas released from the plastic can be expanded, and a plastic molded product can be smoothly removed from a mold by utilizing the expanded gas.

Hereinabove, the method for molding a thermoplastic resin product and the molding apparatus therefor are explained with reference to the preferable embodiments and the like. The method for molding a thermoplastic resin product and the molding apparatus therefor are not restricted to those embodiments mentioned above and the like, and it is needless to say that various modifications are possible within the scope of the invention.

For example, the configuration in which the stamper and/or the cooling member are held in a movable manner is not restricted to the above-mentioned configuration, and may have various configurations.

In the above-mentioned molding apparatuses 1, 1b, 1c, 1d and 1e, the cooling member 4 is used. The cooling member 4 is forcedly cooled by using the channel 512 or the forced cooling plate 41. The configuration is, however, not limited thereto. For example, though not shown, instead of providing the cooling member 4 and the channel 512, or instead of proving the cooling member 4 and the forced cooling plate 41, only the forced cooling member 41 may be provided. By doing this, a plurality of forced cooling plates 41 may be sequentially used, and effective cooling may be conducted even in the case where molding is conducted continuously.

The invention claimed is:

1. A method for molding a thermoplastic resin product comprising:
   radiation heating, with infrared rays radiated from a heating apparatus, a stamper that is remote from a cooling member;
   transferring a structure of a shape-forming surface of the stamper that has been radiation heated to a transfer surface of a thermoplastic resin;
   solidifying or curing the thermoplastic resin by cooling the stamper with the cooling member in a state where the shape-forming surface is pressed against the transfer surface, wherein the cooling member is in contact with the stamper; and releasing a molded product from a mold by releasing the state where the shape-forming surface is pressed against the transfer surface, wherein the radiation heating of the stamper comprises transmitting the infrared rays through the cooling member that is formed of an infrared rays-transmissive material.

2. The method for molding a thermoplastic resin product according to claim 1, wherein the transferring of the structure is conducted in the state where the cooling member is in contact with the stamper.

3. The method for molding a thermoplastic resin product according to claim 1, wherein the transferring of the structure is conducted by the stamper that is held while being remote from the cooling member.

4. The method for molding a thermoplastic resin product according to claim 3, wherein, during the transferring of the structure, the stamper is held while being remote from the cooling member by applying a pressure to a gap between the cooling member and the stamper.

5. The method for molding a thermoplastic resin product according to claim 2, wherein, during the transferring of the structure, the stamper is radiation heated.

6. The method for molding a thermoplastic resin product according to claim 2, wherein the transferring of the structure is conducted by utilizing only heat that has been stored by the stamper in the heating step.

7. The method for molding a thermoplastic resin product according to claim 3, wherein, during the transferring of the structure, the stamper is radiation heated.

8. The method for molding a thermoplastic resin product according to claim 4, wherein, during the transferring of the structure, the stamper is radiation heated.

9. The method for molding a thermoplastic resin product according to claim 3, wherein the transferring of the structure is conducted by utilizing only heat that has been stored by the stamper in the heating step.

10. The method for molding a thermoplastic resin product according to claim 4, wherein the transferring of the structure is conducted by utilizing only heat that has been stored by the stamper in the heating step.

* * * * *